(12) United States Patent  (10) Patent No.: US 9,293,903 B2
Do  (45) Date of Patent: Mar. 22, 2016

(54) ELECTRICAL JUNCTION BOX

(71) Applicant: Man Khac Do, Federal Way, WA (US)

(72) Inventor: Man Khac Do, Federal Way, WA (US)

(73) Assignee: Man Khac Do, Federal Way, WA (US)

( * ) Notice: Subject to any disclaimer, the term of this patent is extended or adjusted under 35 U.S.C. 154(b) by 0 days.

(21) Appl. No.: 13/726,114

(22) Filed: Dec. 22, 2012

(65) Prior Publication Data

US 2014/0174781 A1  Jun. 26, 2014

(51) Int. Cl.
*H02G 3/16* (2006.01)
*H01R 13/46* (2006.01)

(52) U.S. Cl.
CPC ...................................... *H02G 3/16* (2013.01)

(58) Field of Classification Search
CPC ........... H02G 3/08; H02G 3/081; H02G 3/16; H02G 15/00; H02G 15/06; H02G 15/076; H02G 15/08; H01R 4/34; H01R 4/30; H01R 13/40; H01R 13/22
USPC ............. 174/480, 481, 50, 53, 57, 58, 59, 60, 174/482, 64, 487, 490, 559; 220/3.2–3.9, 220/4.02; 439/535, 536, 76.1, 76.2, 720, 439/721, 722
See application file for complete search history.

(56) References Cited

U.S. PATENT DOCUMENTS

| | | | | | |
|---|---|---|---|---|---|
| 1,659,303 | A | * | 2/1928 | Rovere | 174/59 |
| 2,882,332 | A | * | 4/1959 | Reisinger | 174/59 |
| 2,917,724 | A | * | 12/1959 | Jackson | 174/59 |
| 3,848,224 | A | * | 11/1974 | Olivero | 174/59 |
| 4,195,194 | A | * | 3/1980 | Kuster et al. | 174/59 |
| 4,415,044 | A | * | 11/1983 | Davis | 174/59 |
| 6,186,838 | B1 | * | 2/2001 | Foster | 174/59 |
| 6,733,345 | B2 | * | 5/2004 | Weise et al. | 174/50 |
| 7,339,121 | B2 | * | 3/2008 | Krauss | 174/60 |
| 7,736,175 | B1 | * | 6/2010 | Savicki et al. | 174/58 |
| 7,968,806 | B2 | * | 6/2011 | Shelton et al. | 174/50 |

* cited by examiner

*Primary Examiner* — Angel R Estrada

(57) ABSTRACT

A convenient electrical juncture box will be used to repairing a broken household electrical wire, or to connect new wires to multiple locations. It provides all components that need for repairing job in a package. The package will include a conductor unit installed on a base structure, a cover box to enclose the entire electrical circuitry, two nails for securing the electrical juncture box to the wooden beam, and four screws for attaching the cover box to the base structure. The electrical juncture box can be mounted on a wooden beam in an open space such as the attic, crawlspace of a frame or similar structure.

6 Claims, 27 Drawing Sheets

FIG 1-6
FIG1-5
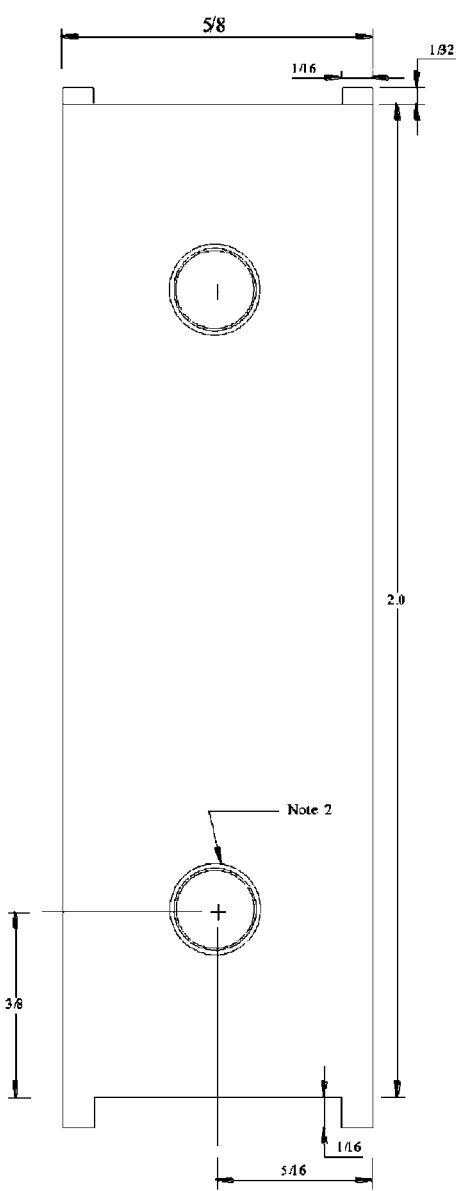
FIG1-7
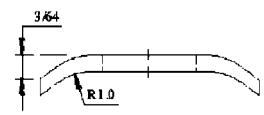

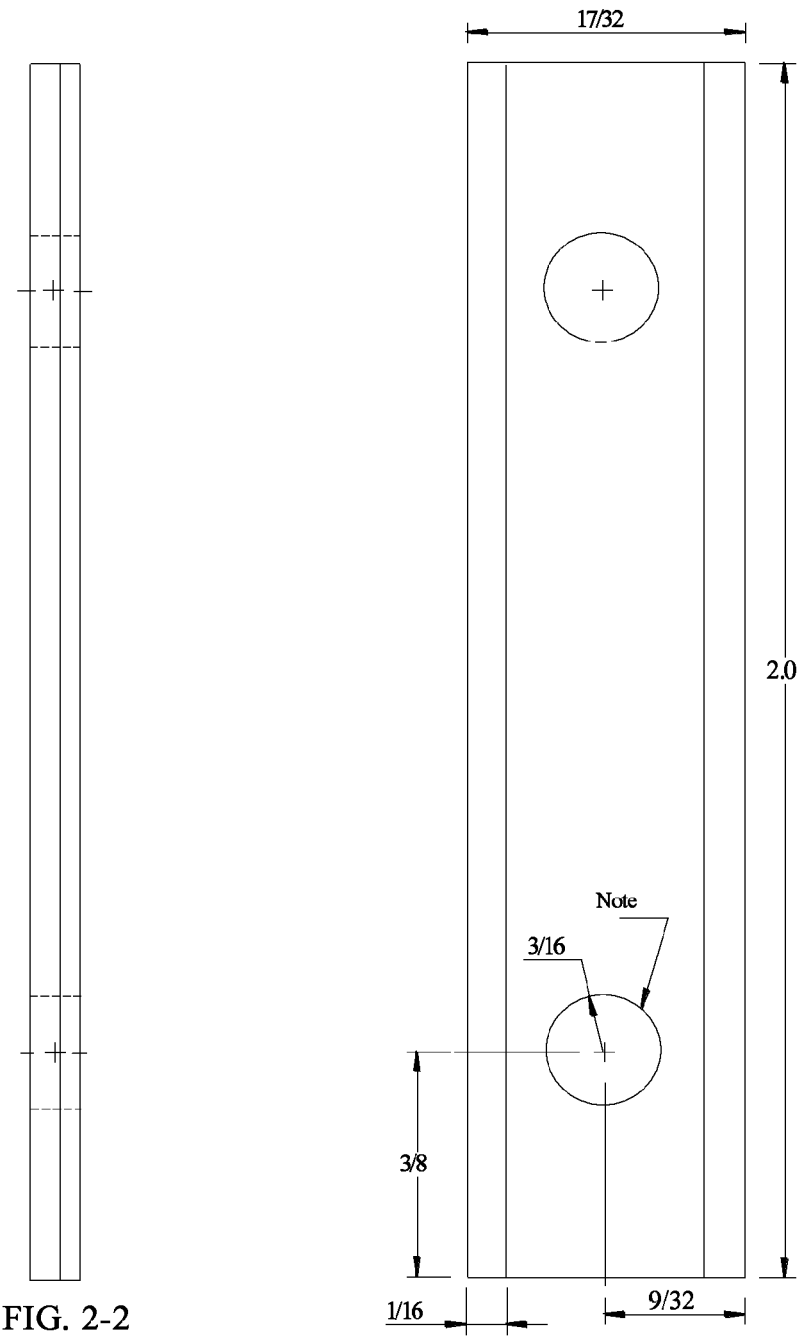

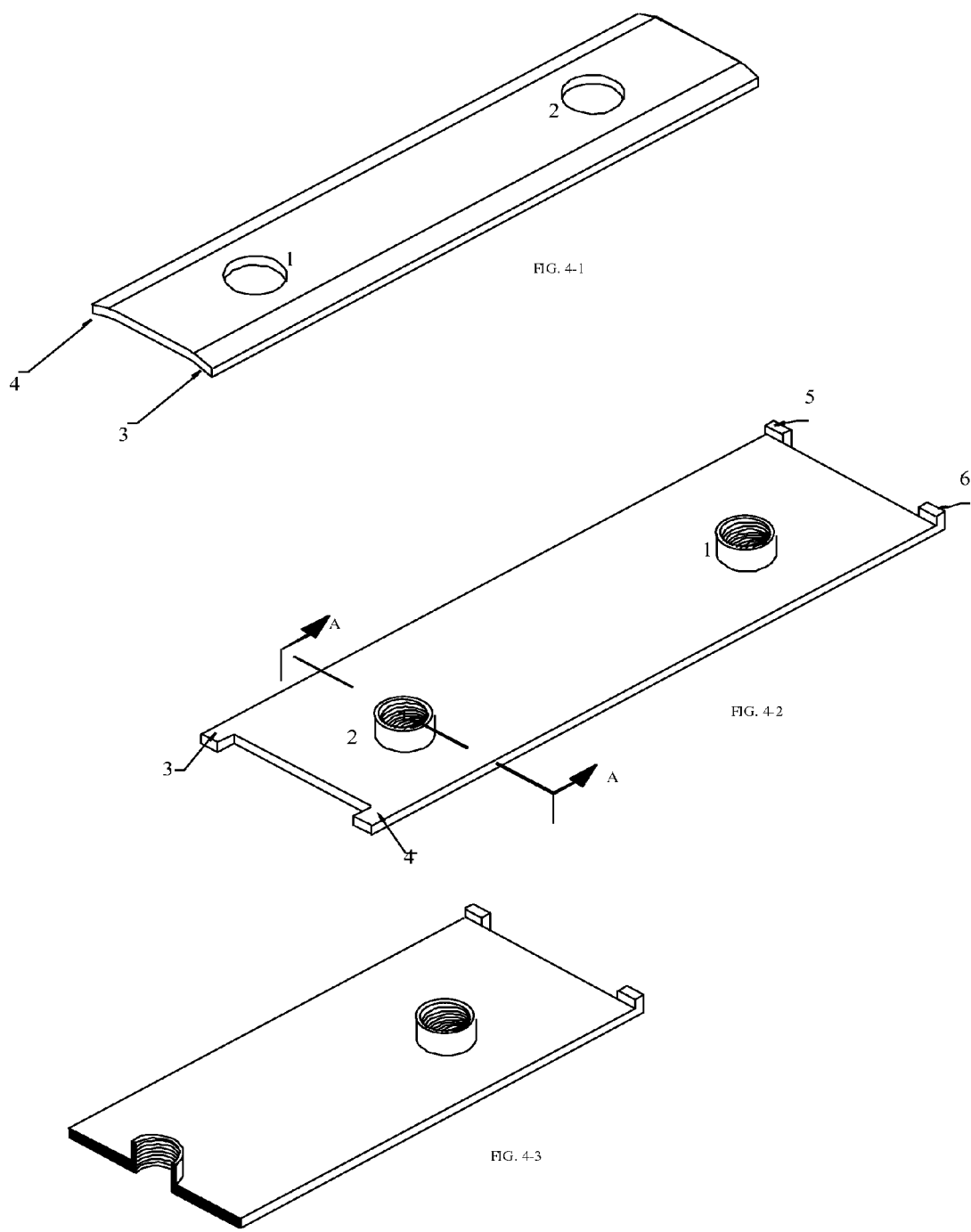

Note: The D is the indication of the diameter.
Otherwise, it is the radius of the circle.
All dimension is in inch.

FIG. 6
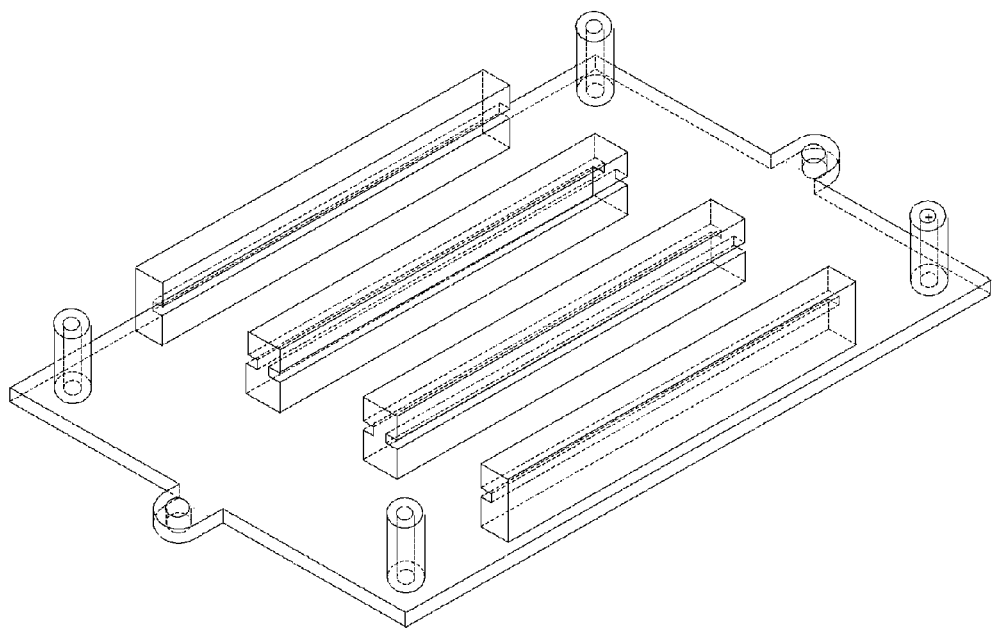
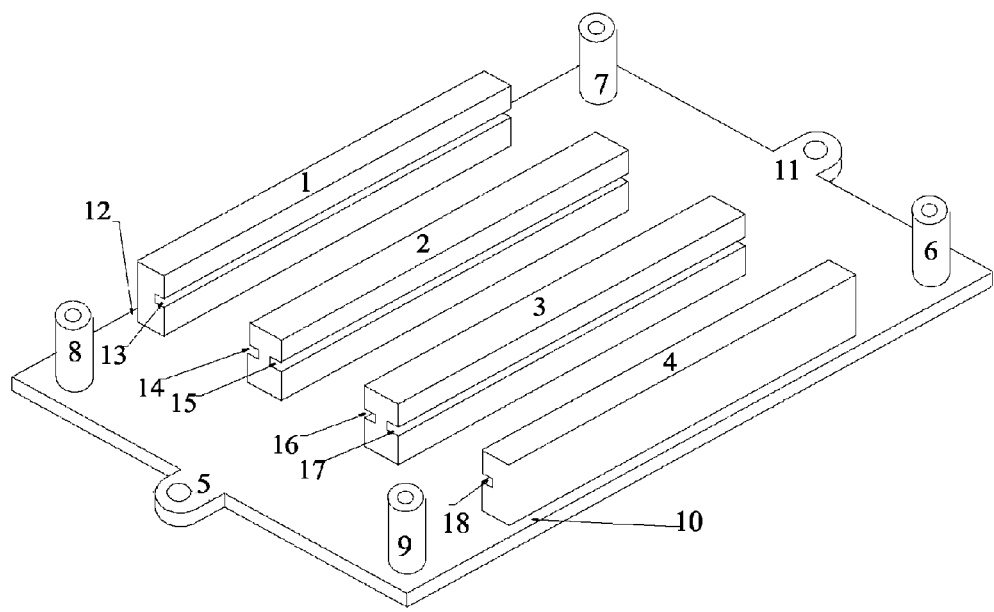
FIG. 7

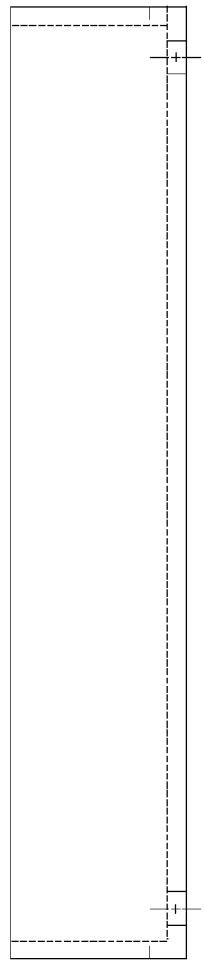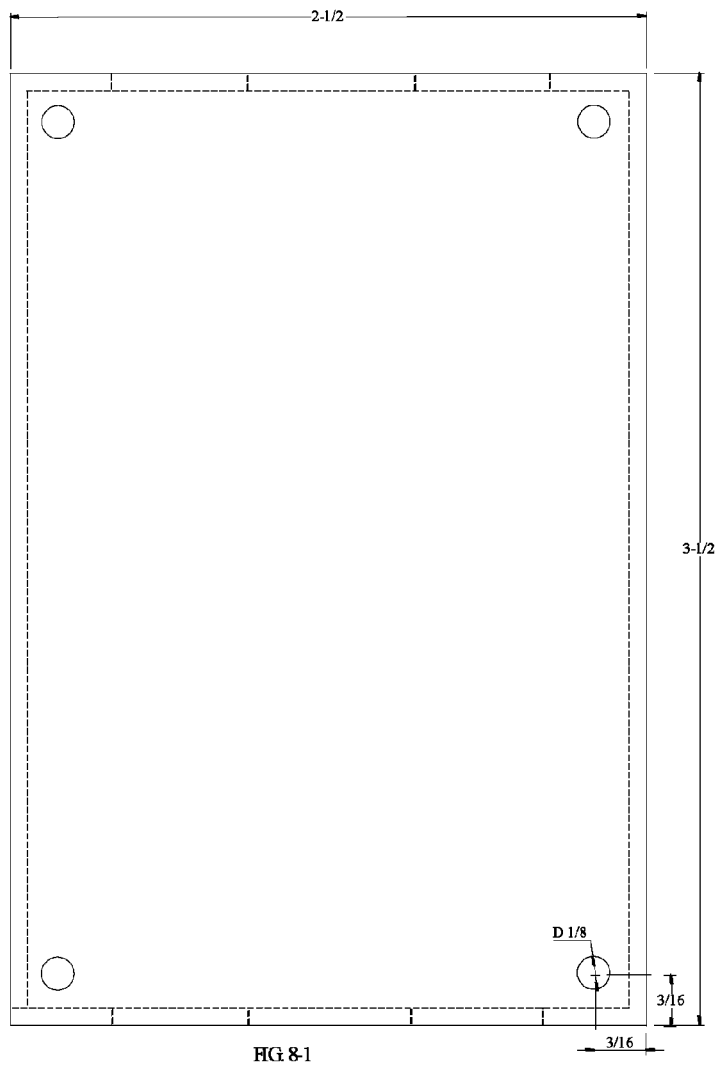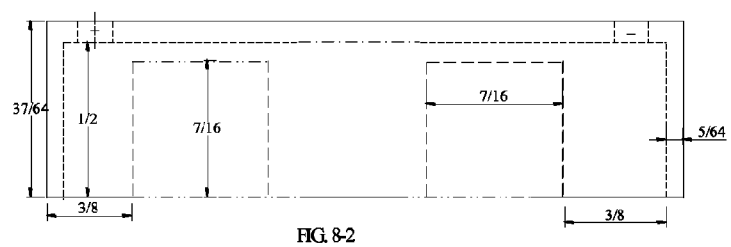
FIG. 8-3
FIG. 8-1
FIG. 8-2

FIG. 9
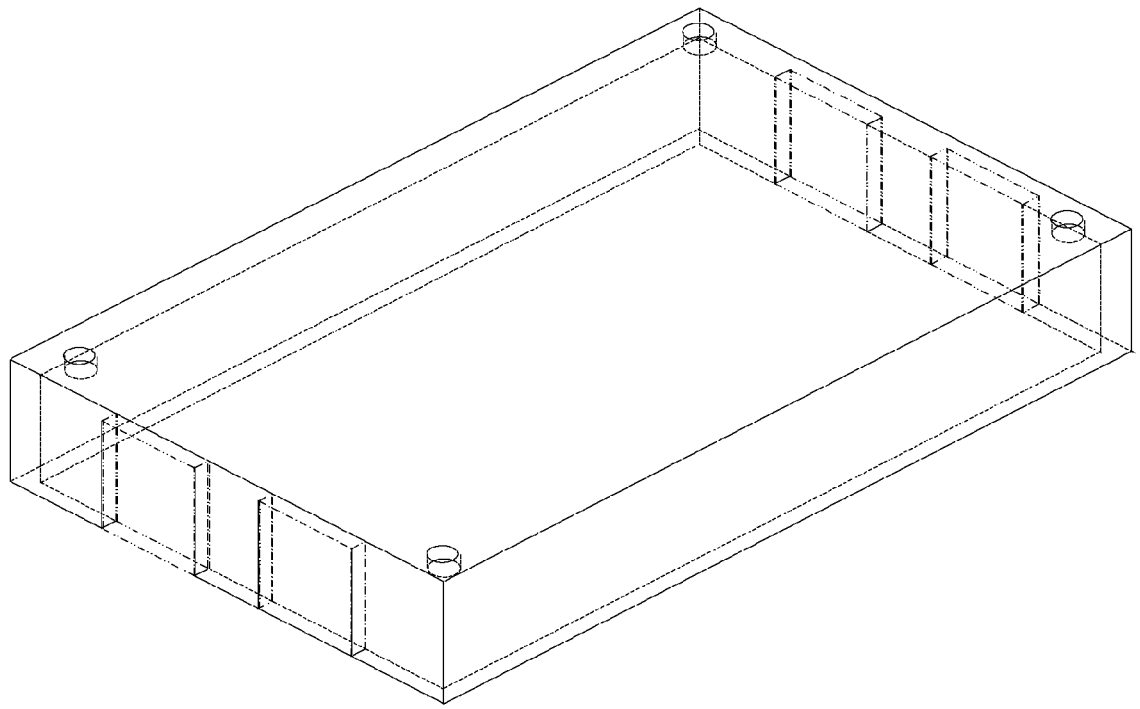
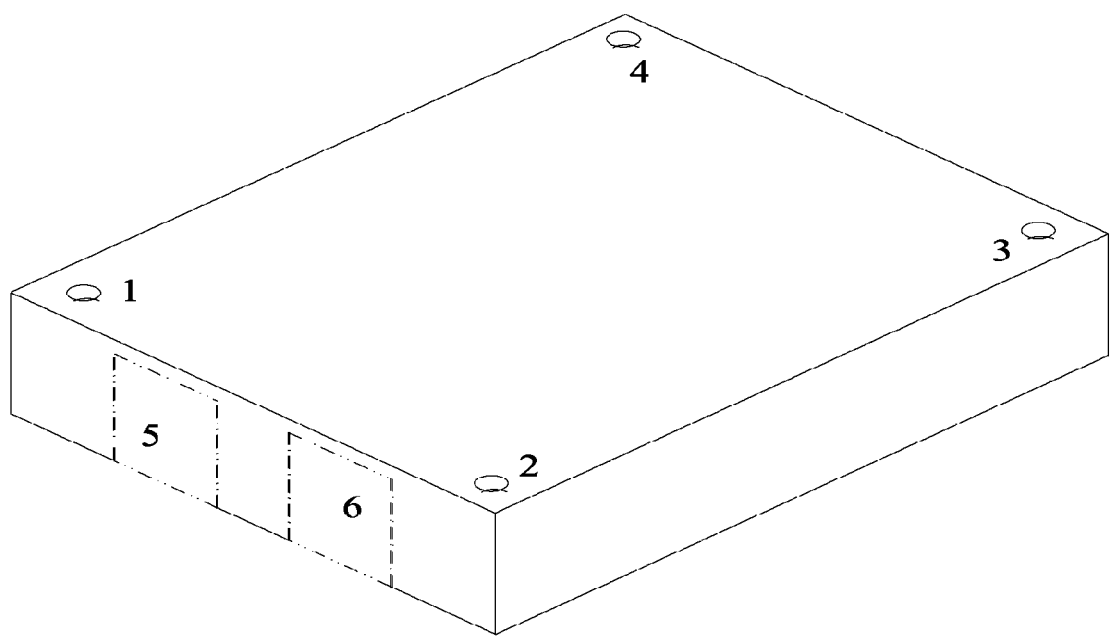
FIG. 10

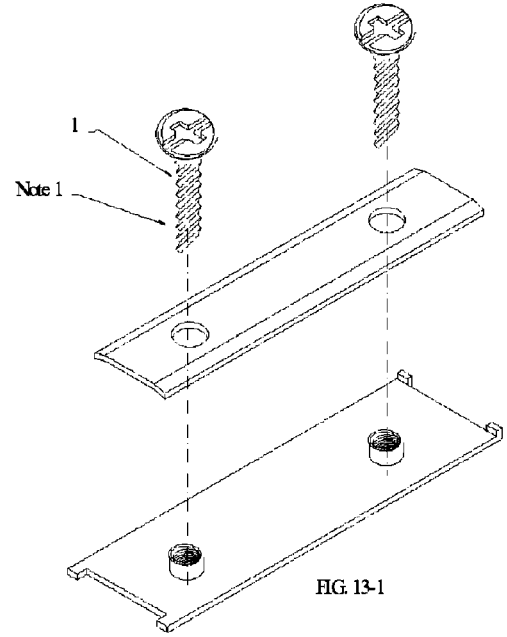
FIG. 13-1
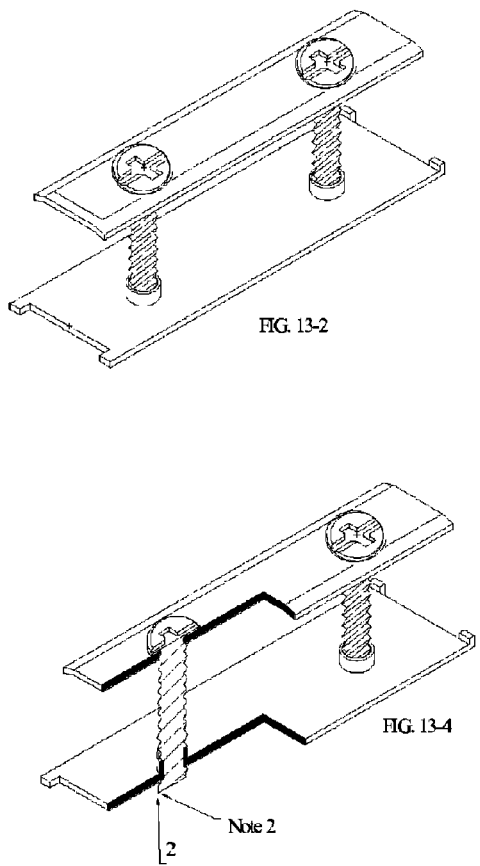
FIG. 13-2
FIG. 13-4
Note 2
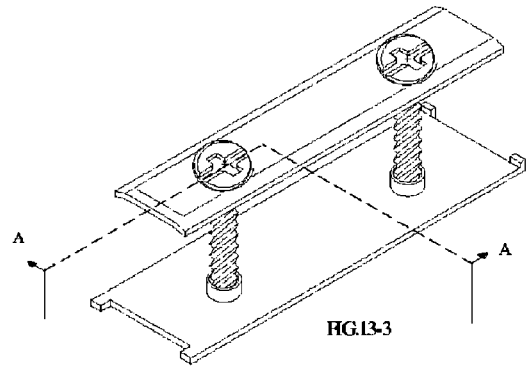
FIG.13-3
Note 1: Size 8-32 screw    Note 2: The key that lock the two condcutor plates together.

FIG. 21
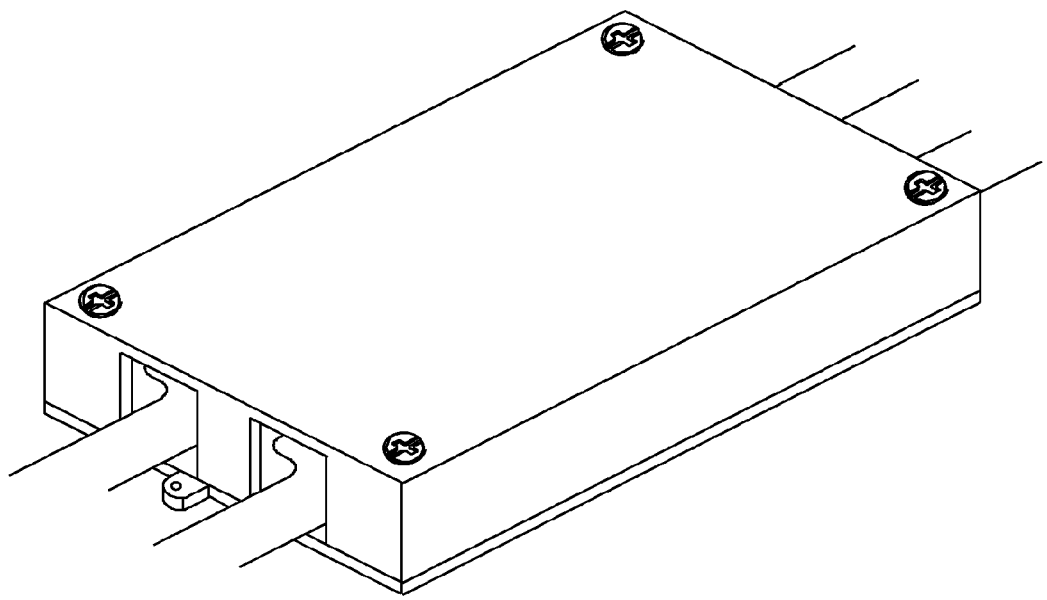
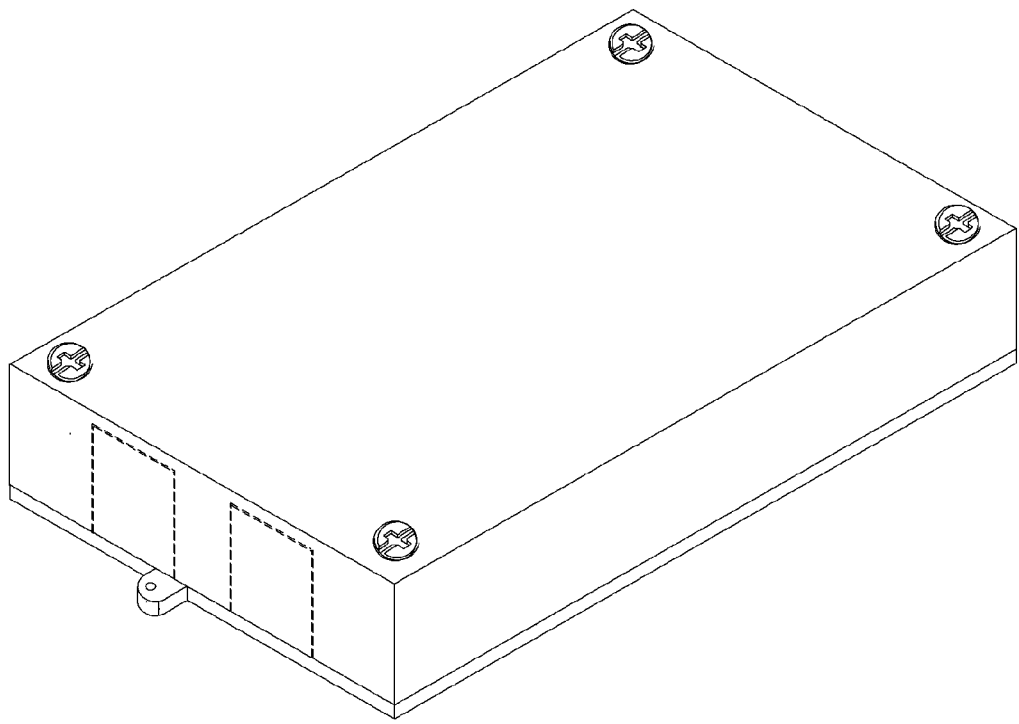
FIG. 22

ELECTRICAL JUNCTION BOX

TECHNICAL FIELD

This invention is generally relate to electrical connection, more particularly, use in repairing damage electrical wires, or provides a convenience to connect an electrical wire to an existing stretching electrical structure.

BACKGROUND

In light frame structures, such as houses, electrical wires are deployed after the assembly of the wooden frame structure is built, and the applicable codes require that the original wire must be secured to the beams using u-shape nails.

When an electrical wire is installed in the building structure, it is stretched out and secured onto the structure as illustrated in FIG. 1-1. If this electrical wire was cut as illustrated in the FIG. 1-2, or the home owner wishes to connect an extra electrical wire to an existing wire as illustrated in FIG. 1-4, part 6 the preparation needs to be done to present accident.

Unfortunately, the stretched and secured wire in the existing structure normally does not provide spare length for twisting together in the reparation as illustrated in FIG. 1-3 parts 1 and 2. A portion of electrical wire, about a foot long, has to be added and other parts have to be purchased separately for the reparation. The following listed parts are needed:

Two net work boxes, 39 cents for each=$0.78
Electrical wire, $8.52 per 15 ft=$8.52
Two net work box covers, $1.29 for ea=$2.58
A bag of wing twists (25 pieces per bag)=$2.60

The total cost of the material will be approximately $14.48[1]. The process of the job is described below.

Price is collected from Lowes at 35425 Enchanted Pkwy S Federal Way, Wash. 98003, March 2013

As illustrated in FIG. 1-3, in order to repair of such a cutting electrical wire, about ½ an inch of the insulator on the ends of the wires needs stripped off, twisted, and held together with wing twists. Juncture boxes 1 and 2 contain the twisting connections of the electrical wires. Part 3 is the portion of electrical wires that need to be added between the two juncture boxes to extend the length of the wires so that they can be twisted together by wing twists. Part 4 is the input electrical wire. Part 5 is the output of the electrical wire.

As illustrated in FIG. 1-4 part 6, an extra connection is connected to existing electrical wire. About ½ an inch of the insulator on the ends of the wires were stripped off, and twisted to hold the wire together by wing twists. Part 1 and 2 are the juncture boxes containing the twisting connections of the electrical wires. Part 3 is the extra electrical wires that needs to be added between the two juncture boxes to extend the length of the wires so that they can be twisted together by wing twists. Part 4 is the input electrical wire. Part 5 is the output of the electrical. Part 6 is the new electrical wire connected to an existing electrical wire.

This repairing and connecting method would be costly and time consuming for home owners and electrical technicians. Also, the electrical wire would easily get loose and might arc to cause a fire.

The invention of the Electrical Juncture Box (EJB) will provide a more secure and easier way to repair a broken electrical wire, or connect an electrical wire to existing an electrical wire. It is also a better way to eliminate the arcing of a loose electrical connection.

SUMMARY OF THE INVENTION

The EJB is invented to prepare or extend electrical wires in an open space in a frame structure such as an attic and crawl space. It will simplify the working process, reduce the cost, and limit fire accident. The EJB will provide all of the necessary components in a package that is needed for repairing a broken electrical wire.

The package provides a conductor base, a cover box, two 1½ inch nails, and four 6%16 size screws.

The conducting components of the EJB are two (2) inches long. This provides room for wire connections.

Before any electrical wire is connected to the EJB, the base of the EJB must be secured on a existing frame structure.

In case the wire was cut, a ½ inch insulator of both ends of a cutting wire will be stripped off, slide nude wires into the slots, and tie the screws down secure the wires. In FIG. 17, part 5 illustrated how the broken wires are installed in the slots.

In the case that the electrical wire was not cut, but its insulator was damaged, then the insulator of the wire will be stripped off for about 2 and ¹⁄₁₆ of inches long. The wires will be slid into the slots, and screwed down to secure the wires. FIG. 17, part 7 shows how the wires are installed into the slots.

As illustrated in FIG. 17, the new electrical wires are connected to an existing electrical wire. It is done through the same process of repairing cut and/or damaged electrical wires.

After the wires are secured on the conductor unit of the EJB, the cover box is installed to cover and secure it from the surrounding environment.

A convenient electrical junction box of this type is used to interconnect power wires to which appliances or other equipment can be attached.

BRIEF DESCRIPTION OF THE DRAWINGS

FIG. 1-2 illustrates a broken electrical wire stretched out on a wooden bean.

FIG. 1-3 illustrates how a broken electrical wire is currently repaired.

FIG. 1-4 illustrates how a broken electrical wire is currently repaired and an added in electrical wire was connected.

FIG. 1-5 illustrates the top view of the lower conductor plate and its dimensions.

FIG. 1-6 illustrates the front view of the lower conductor plate and its dimensions.

FIG. 1-7 illustrates the side view of the lower conduct plate and its dimensions.

FIG. 2-1 illustrates the top view of the lower conductor plate and its dimensions.

FIG. 2-2 illustrates the front view of the upper conductor plate and its dimensions.

FIG. 2-3 illustrates the side view of the upper conductor plate and its dimensions.

FIG. 3-1 illustrates the orthographical view of the upper conductor plate.

FIG. 3-2 illustrates the orthographical view of the lower conductor plate.

FIG. 4-1 illustrates the isometric view of the upper conductor plate.

FIG. 4-2 illustrates the lower conductor plate's isometric view and also illustrates the cutting plane of the plate.

FIG. 4-3 illustrates the cutting section view of the lower conductor plate.

FIG. 5-1 illustrates the top view of the base structure, and its dimensions.

FIG. 5-2 illustrates the front view of the base structure, and its dimensions.

FIG. 5-3 illustrates the side view of the base structure, and its dimensions.

FIG. 6 illustrates the orthographical view of the base structure.

FIG. 7 illustrates the isometric view of the base structure.

FIG. 8-1 illustrates the top view of the cover box and its dimensions.

FIG. 8-2 illustrates the side view of the cover box and its dimensions.

FIG. 8-3 illustrates the front view of the cover box.

FIG. 9 illustrates the orthographical view of the cover box.

FIG. 10 illustrates the isometric view of the cover box.

FIG. 13-1 illustrates the process of assembly of the upper and lower conductor plates with the screws.

FIG. 13-2 illustrates the isometric view of the conductor unit.

FIG. 13-3 illustrates the isometric view of the cutting plane of the conductor unit.

FIG. 13-4 illustrates the isometric view of the cutting section of the conductor unit.

FIG. 21 illustrates a complete assembly EJB with wires

FIG. 22 illustrates a complete assembly EJB with electrical wire.

FIG. 23-1 illustrates the top view of the base structure with the conduit connector and its dimensions.

FIG. 23-2 illustrates the front view of the base structure with the conduit connector and its dimensions.

FIG. 23-3 illustrates the side view of the base structure with the conduit connector and its dimensions.

FIG. 26-1 illustrates the top view of the cover box with the conduit connectors.

FIG. 26-2 illustrates the front view of the cover box with the conduit connectors unit.

FIG. 26-3 illustrates the side view of the cover box with the conduit connectors.

DETAIL DESCRIPTION OF THE ELECTRICAL JUNCTURE BOX

Figure 1:
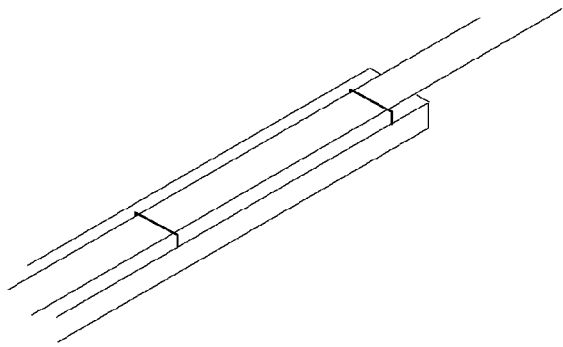
FIG. 1-1 illustrates a stretched out and secured electrical wire on a wooden beam.
Figures 1, 2:
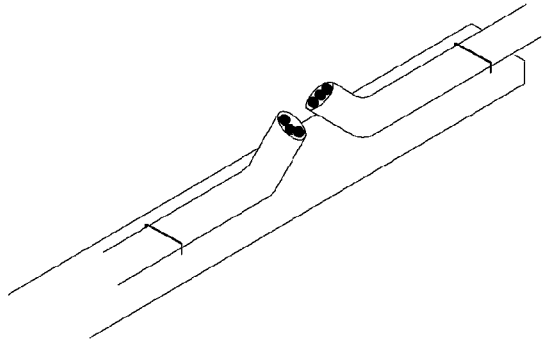
Figures 1, 2, 3:
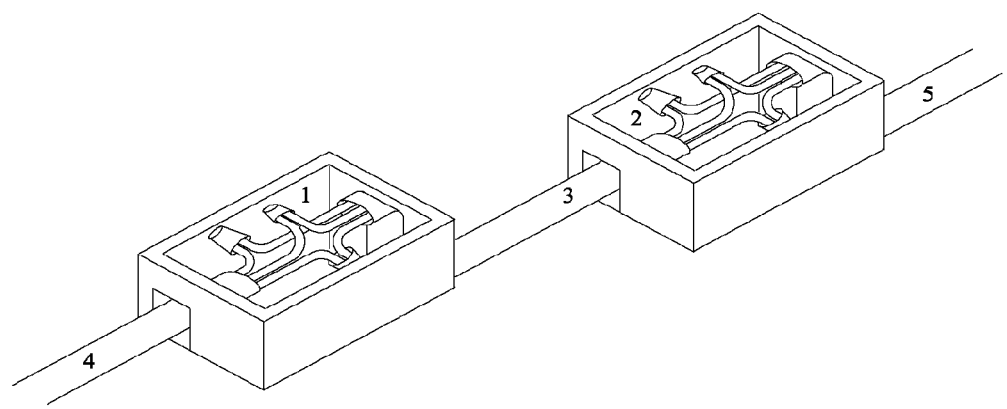

FIG. 1-1, FIG. 1-2 and FIG. 1-3 illustrates the top view, front view and side view of the lower conductor plate respectably; their dimensions are shown in the figures. The plate will be made out of copper, referable the same cope grade as that of electrical outlet.

FIG. 2-1, FIG. 2-2, and FIG. 2-3 illustrates the top view, front view and side view of the upper conductor plate respectably; their dimensions are shown in the figures. The plate will be made out of copper, preferably the same cope grade as the electrical outlet's.

FIG. 3-1 and FIG. 3-2 illustrates orthographical views of the upper and lower conductor plates.

Figures 1, 2, 3, 4:
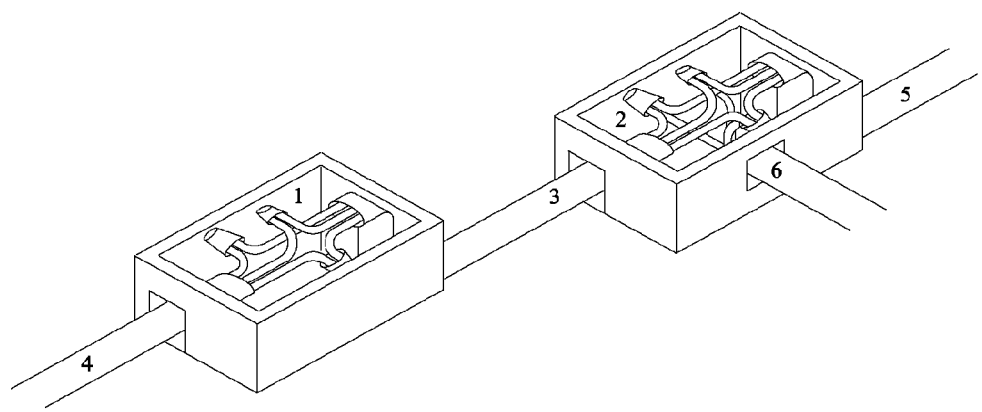
Figures 1, 3:
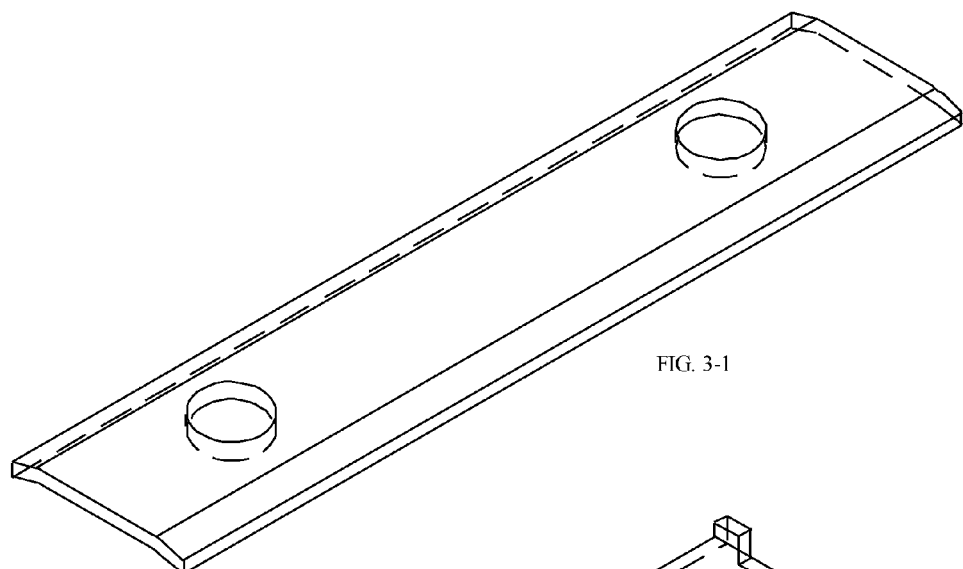
Figures 2, 3:
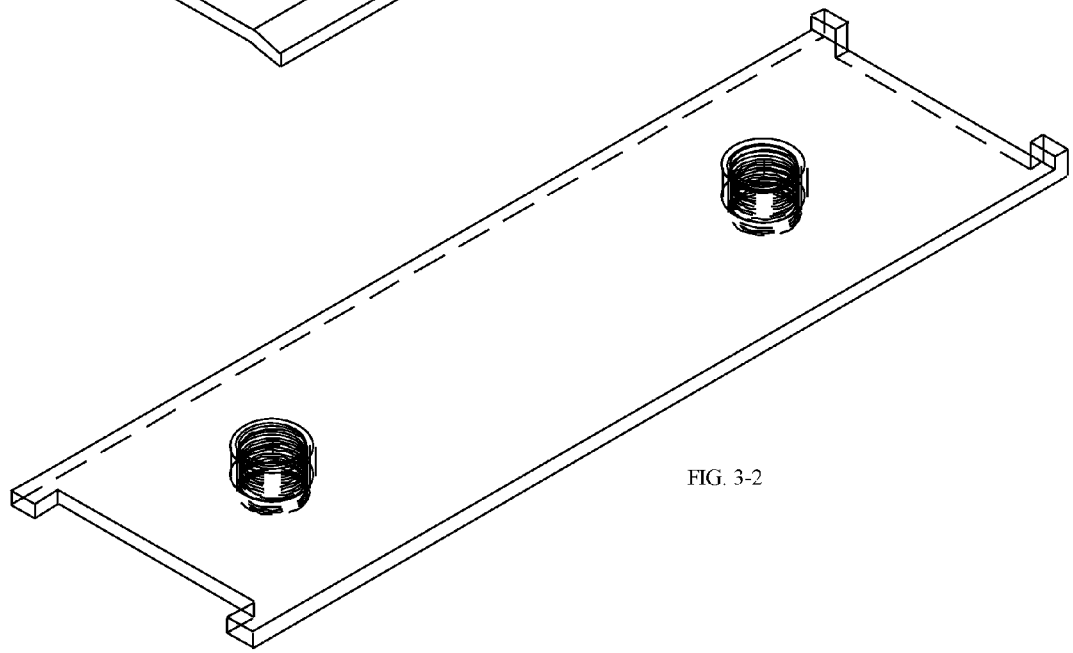
Figures 1, 5:
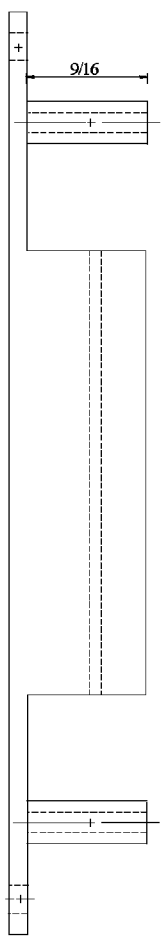
Figures 2, 5:
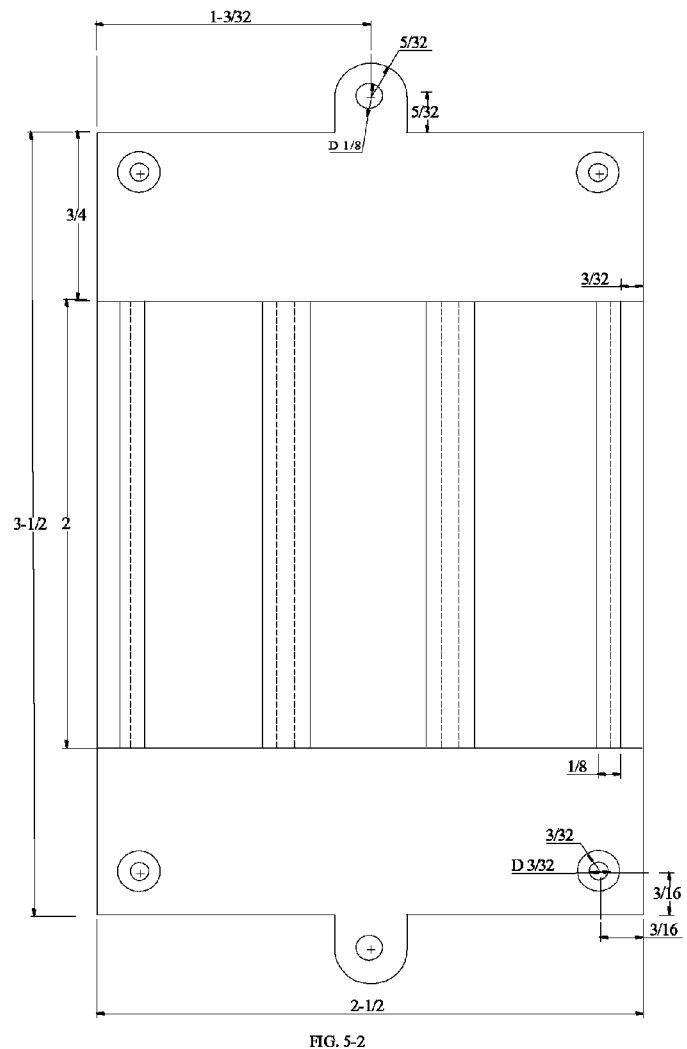
Figures 3, 5:
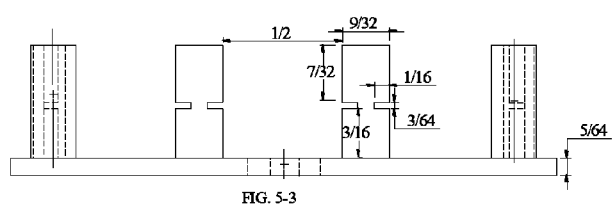
Figure 18:
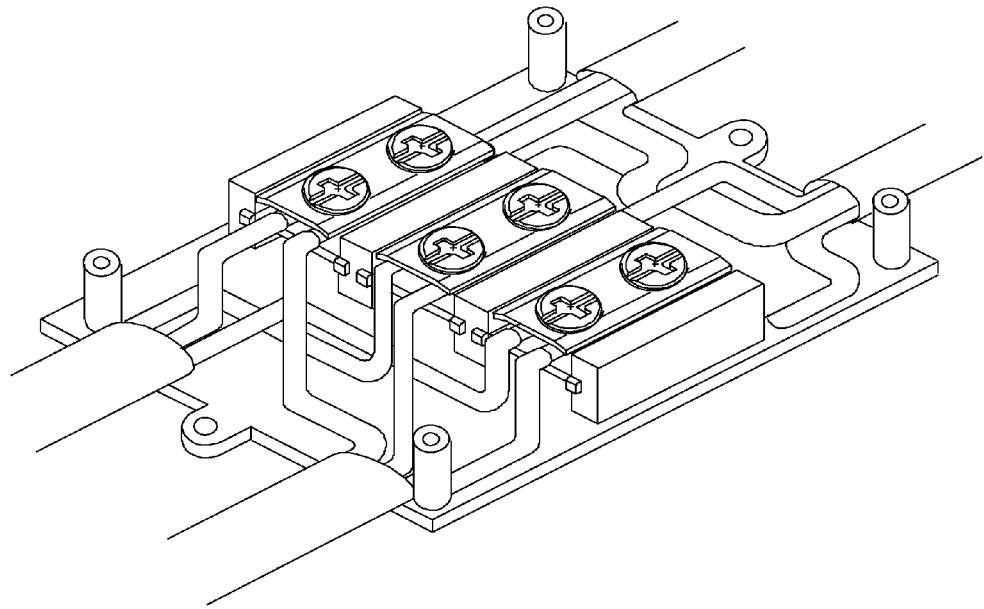
FIG. 18 illustrates the electrical juncture unit with secured electrical wires.

FIG. 4-1 illustrates the isometric of the upper conductor plate. The holes in parts 1 and 2 are designed for the threading part the screw size 8-3 to go through but not for the head of the screw. Parts 3 and 4 are bent down as an arc with a radius of 1 inch (FIG. 2-3) alone the long edges of the plate. The purpose of the design is to force the electrical wire to have good contact with the screw. That will increase the conducting surface when the upper place is pressed down by the screws to sandwich the wire between the upper and lower conductors as illustrated in FIG. 18.

FIG. 4-2 illustrates the isometric of the lower conductor plate. The thread of the holes in part 1 and 2 are designed to fit the screw sizes 8-32, the same type of screw that is used in the electrical outlet in a typical household. Parts 3 and 4 are the sentinel keys to lock the conductor units (FIG. 13-2) in their slots when they are bent down as illustrated in FIG. 15 part 1. Parts 5 and 6 are sentinel keys to guard the conductor units (FIG. 13-2) from sliding through their slots. The keys were fabricated into L shapes before assembly.

FIG. 4-3 illustrates a sectional view of the lower conductor plate to show the thread of the holes for the screws to secure the electrical wires.

FIG. 5-1, FIG. 5-2 and FIG. 5-3 illustrates the top, front and side view of the base structure of the electrical juncture box; their dimensions are shown in the figures. The base structure will be made out of the same material of the net work box's that is used in a electrical connection.

FIG. 6 illustrates the orthographical views of the base structure of the electrical box.

Figure 20:
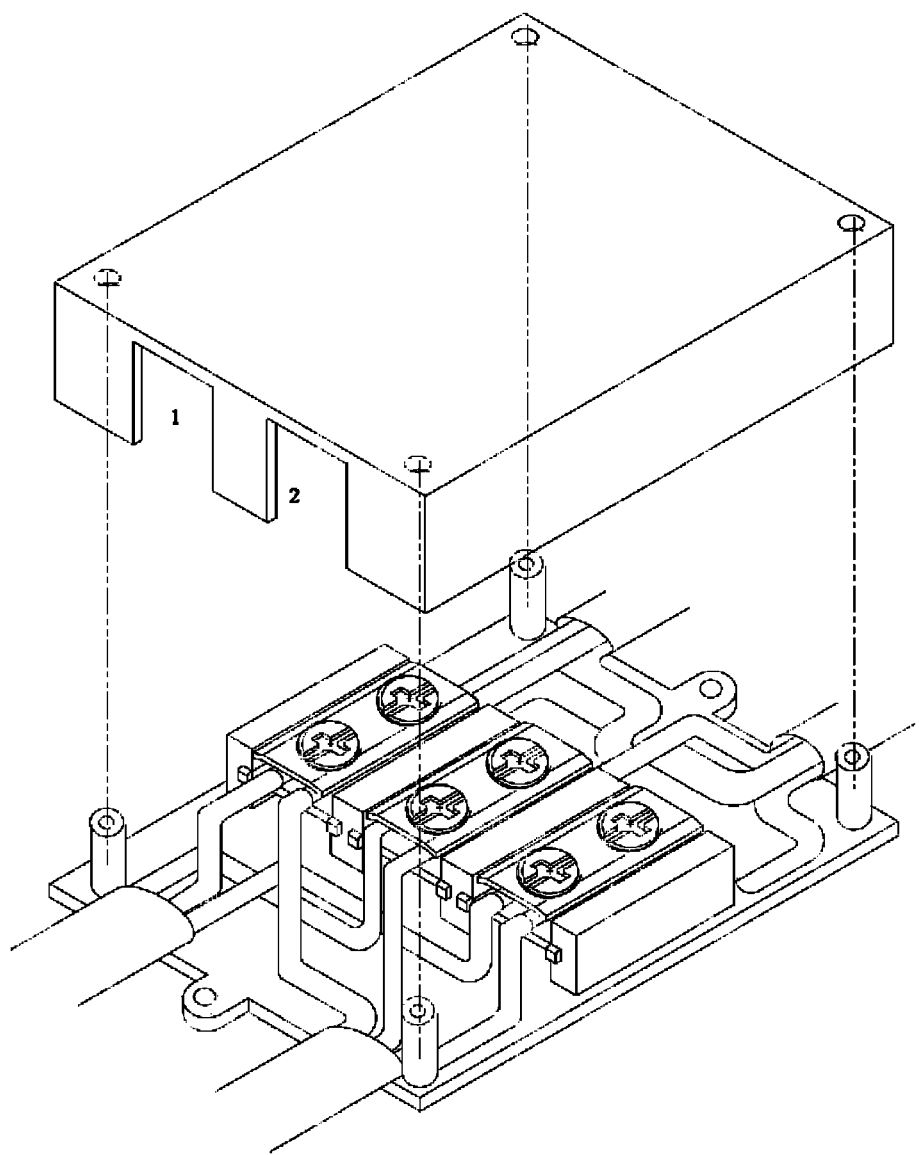
FIG. 20 illustrates the process of installing the cover box on the electrical juncture unit.
Figures 2, 23:
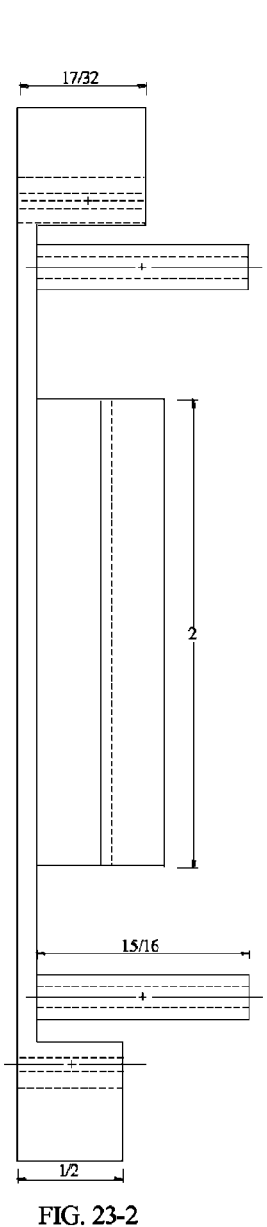
Figures 1, 23:
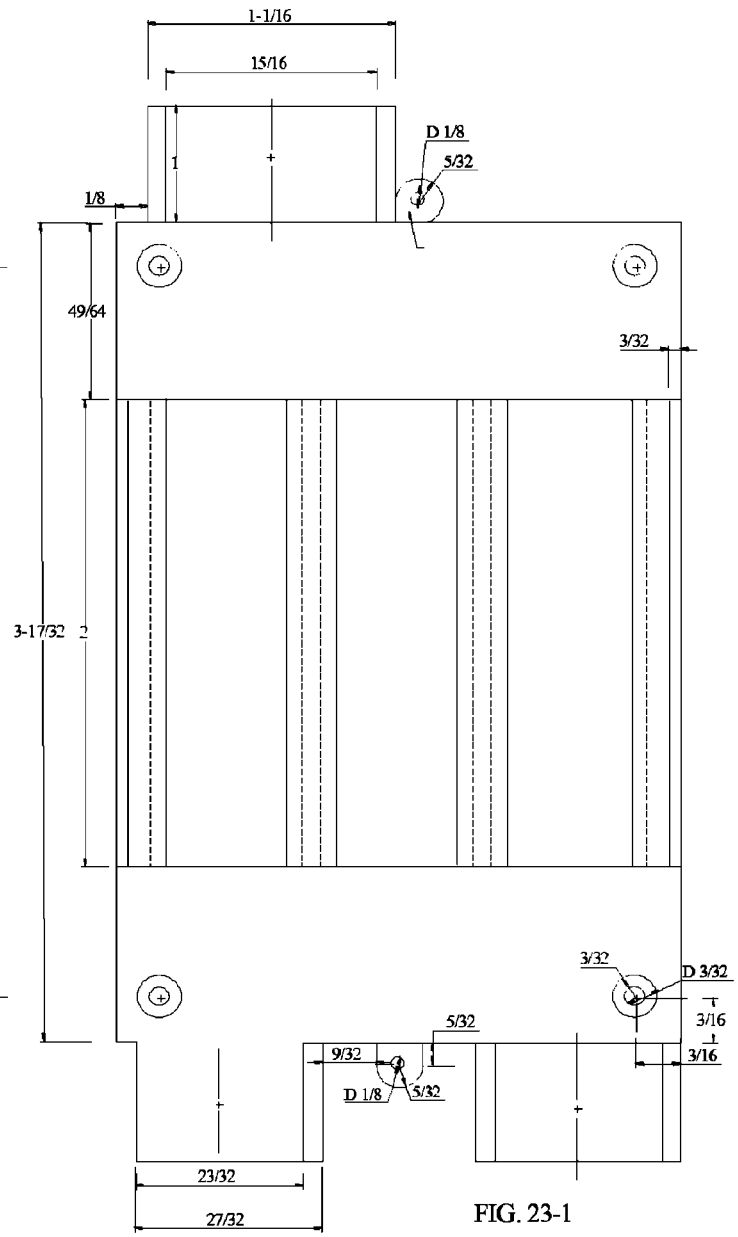
Figures 3, 23:
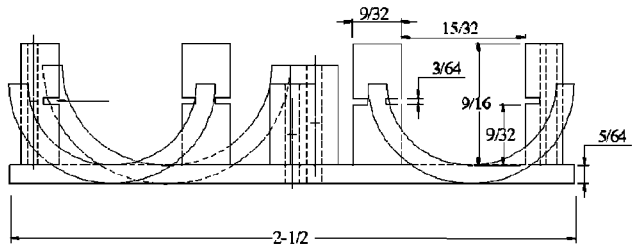

FIG. 7 illustrates isometric view of the base structure of the electrical box. Parts 1, 2, 3, and 4 are the bearers of the slots for holding the conductor units (FIG. 13-2). They also serve as the insulators between the conductor units. Parts 5 and 11 are the holes for nailing the base structure on the existing structure. These nails holes are outside of the cover area of the electrical juncture box so that they will not interfere with the naked electrical wires. Part 6, 7, 8, and 9 are posts with holes for installing the cover box on the top of the electrical juncture unit (FIG. 20). The holes in the posts were designed to fit a metal screw size of 6%16. The thread will be cut when the screw is being installed. The posts also serve as insulators between the metal screws and the electrical wire. Parts 10 and 12 are extra space on the surface of the base structure for the edge of the cover box to rest on. Part 12, 14, 15, 16, 17, and 18 are the slots to hold the conductor unit.

FIG. 8-1, FIG. 8-2 and FIG. 8-3 illustrates the top, front and side views of the cover box of the electrical juncture unit respectably; their dimensions are shown in the figures. The cover box will be made out of the same material of the net work box's which is used in electrical connection.

FIG. 9 illustrates the orthographical view of the cover box.

FIG. 10 illustrates the isometric view of the cover box. Parts 1, 2, 3, and 4 are the holes the threaded part of the screw sizes 6$^9/_{16}$ go through but are not for the screw heads. These holes are used to install the cover over the electrical juncture box. Part 5 and 6 are plastic plates. They are attached loosely to the cover box. They will be removed when electrical wire are installed. There are two on each end of the box.

Figure 11:
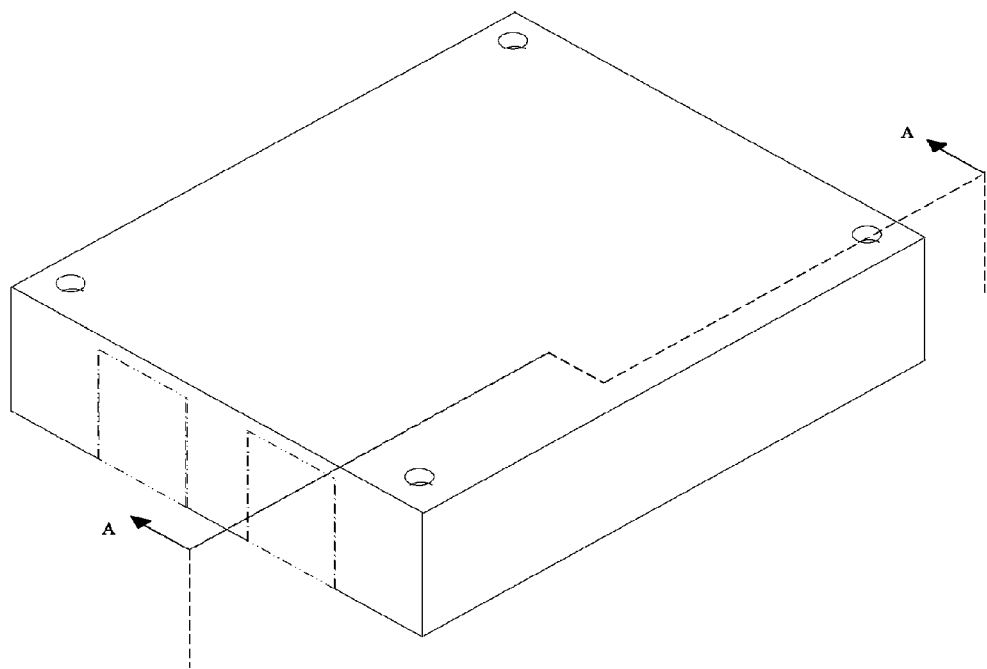
FIG. 11 illustrates the isometric view of the cutting plane of the cover box.

FIG. 11 illustrates the isometric view of the cutting plane of the cover box.

Figure 12:
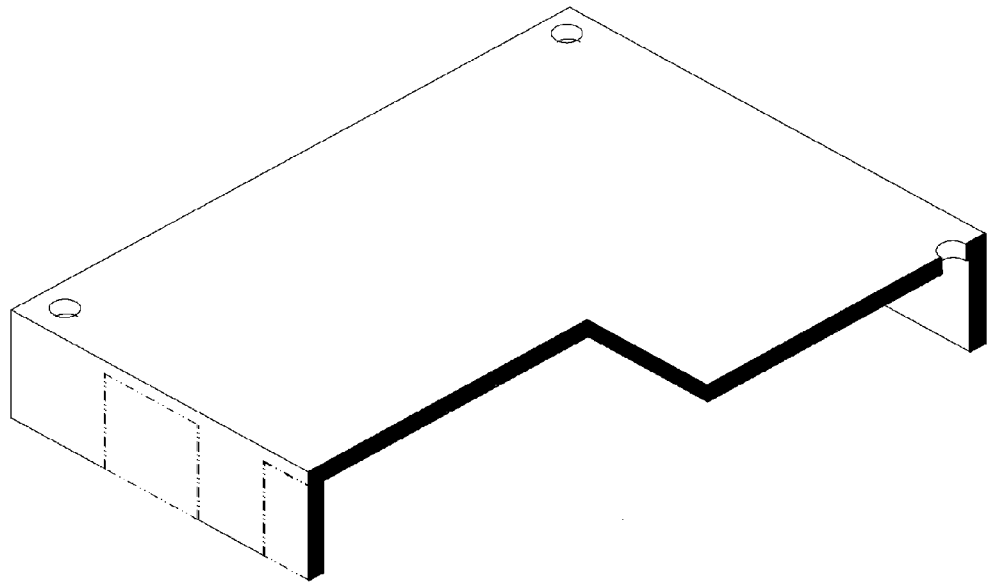
FIG. 12 illustrates the isometric view of the cutting section of the cover box.

FIG. 12 illustrates the isometric sectional view. The open side is in of bottom of the box.

FIG. 13-1 illustrates the connection of the upper conductor plate and the lower conductor plate by the screws. Part 1 indicates that screw is the same one that used in the household electrical circuit. The screws go through the holes on the upper conductor and tie into the lower conductor to form a conductor unit as illustrated in FIG. 13-2.

FIG. 13-2 illustrates the conductor unit.

FIG. 13-3 illustrates the cutting plane of the conductor unit.

FIG. 13-4 illustrates the cutting section of the conductor unit. Part 2 illustrates the head of the screw is smashed after the conductor unit is installed to form a lock to lock the upper and lower conductors together.

Figure 14:
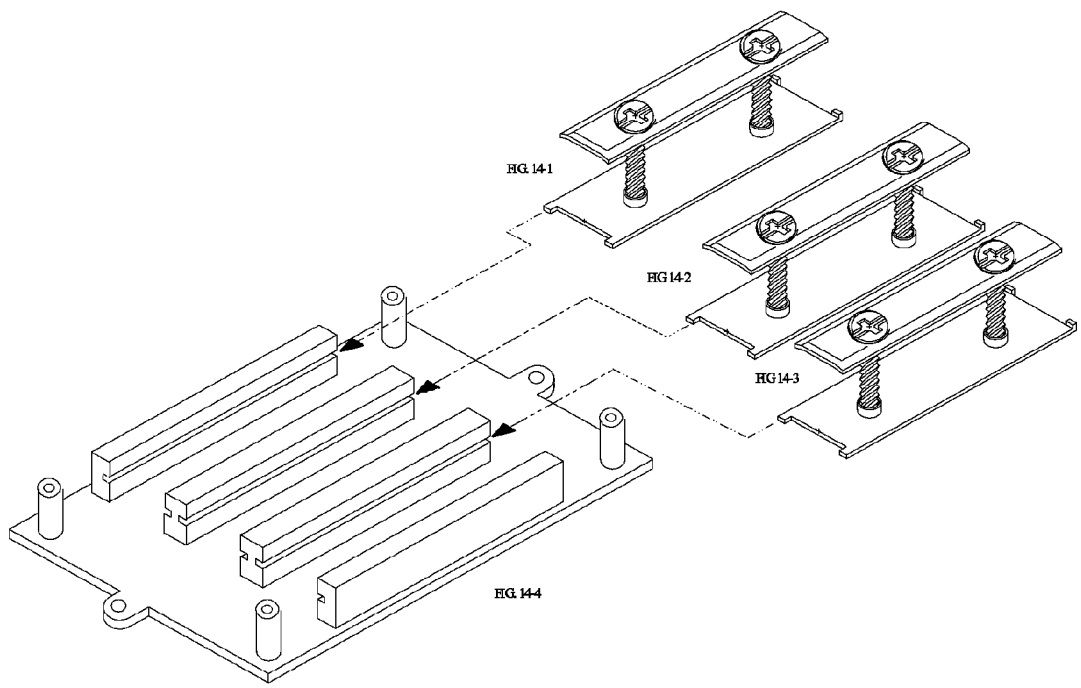
FIG. 14 illustrates the process of installing the conductor unit to the base structure.

FIG. 14 illustrates the process of the installation of the conductor units. The illustration of the conductor units FIG. 14-1, FIG. 14-2, and FIG. 14-3 are slid into the slots on the base structure, FIG. 14-4, as shown by the arrows.

Figure 15A:
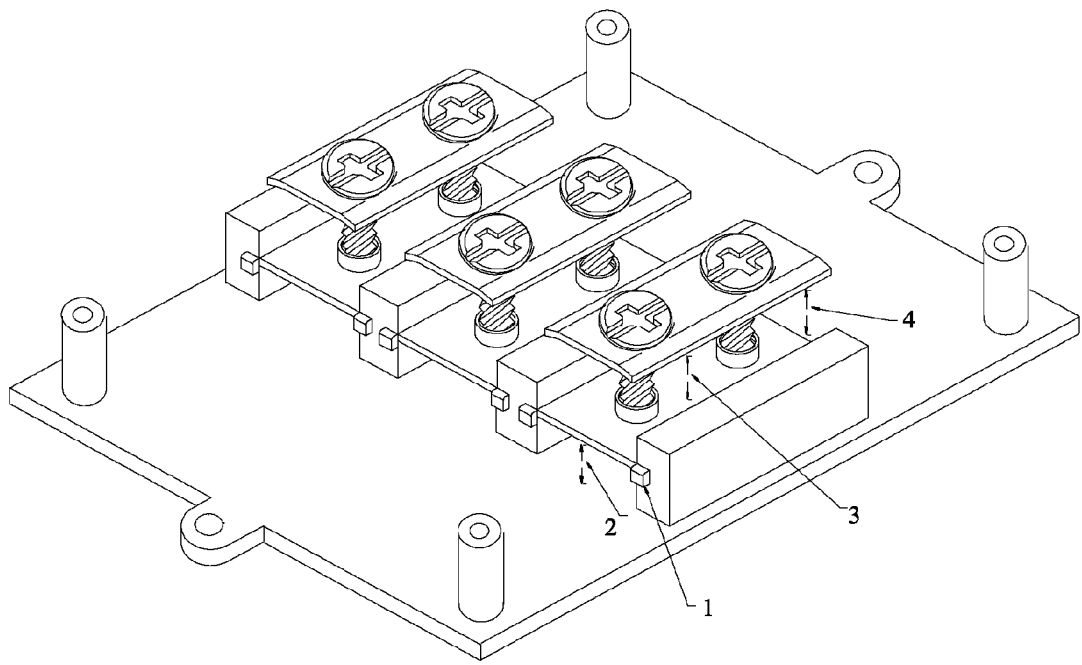
FIG. 15A illustrates the electrical juncture unit.

FIG. 15A illustrates a complete electrical juncture unit. Part 1 illustrates that the sentinel keys were bent down to lock the conductor units in places.

Figure 15B:
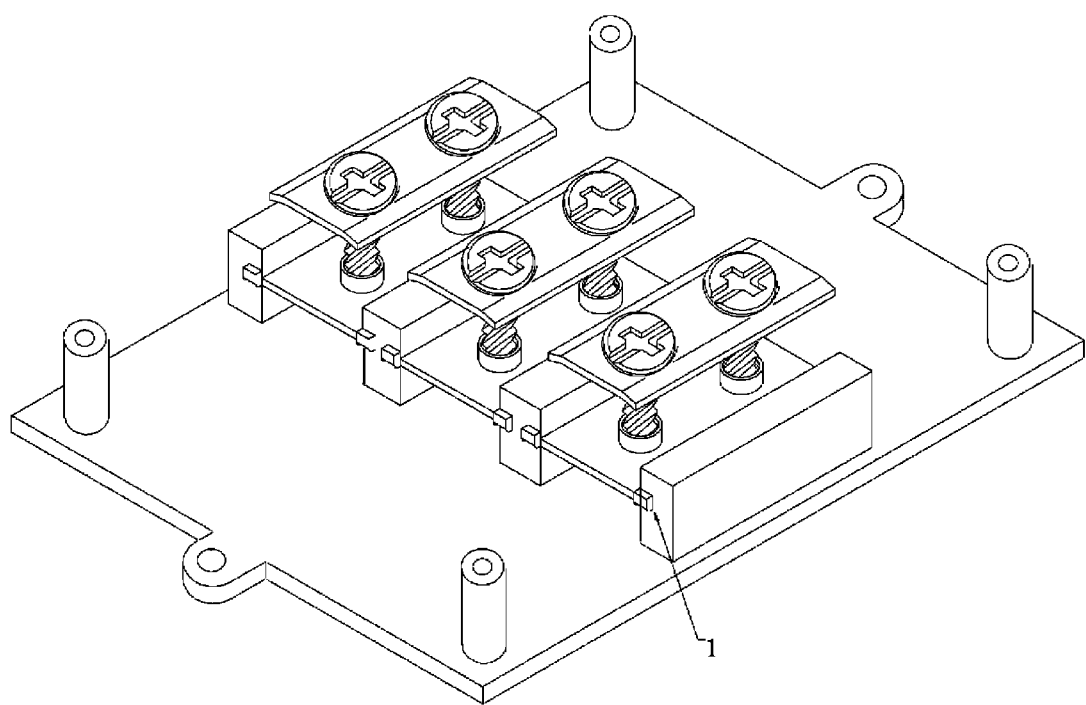
FIG. 15B illustrates the electrical juncture unit at 180 degree turn.

FIG. 15B illustrates the other end of the electrical juncture unit. Part 1 illustrates that the sentinel keys were bent up to hold the conductor units from sliding through the slots.

Figure 16:
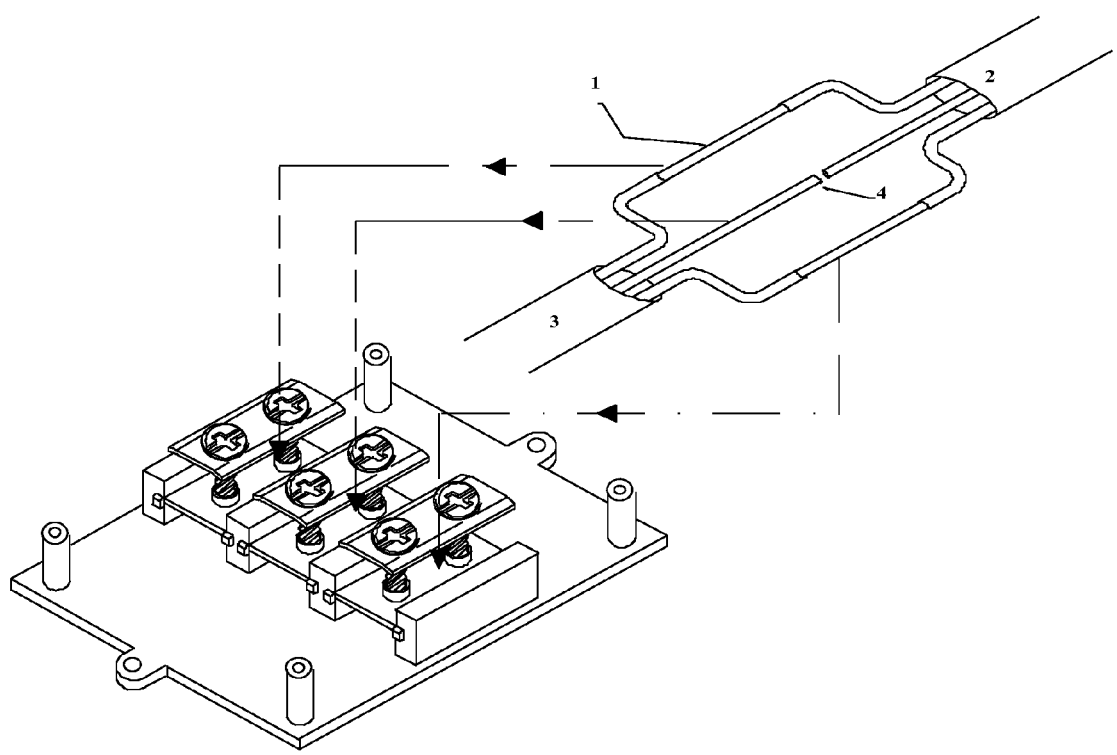
FIG. 16 illustrates the process of the installation of the electrical wire to the electrical juncture unit.

FIG. 16 illustrates the process of installing the electrical wires to the electrical juncture unit. Part 1 illustrates about 2$^1/_{16}$ inch of insulator was stripped off the electrical wires. Part 4 illustrates part of the middle wire is cut because the other two wires were bent in a as such angle that makes the middle wire to have an access length so that three wire can fit in the conductor unit. The cut is an optional. The user may able to install the wire without cutting the middle wire. Part 2 and 3 are normal electrical wire.

Figure 17:
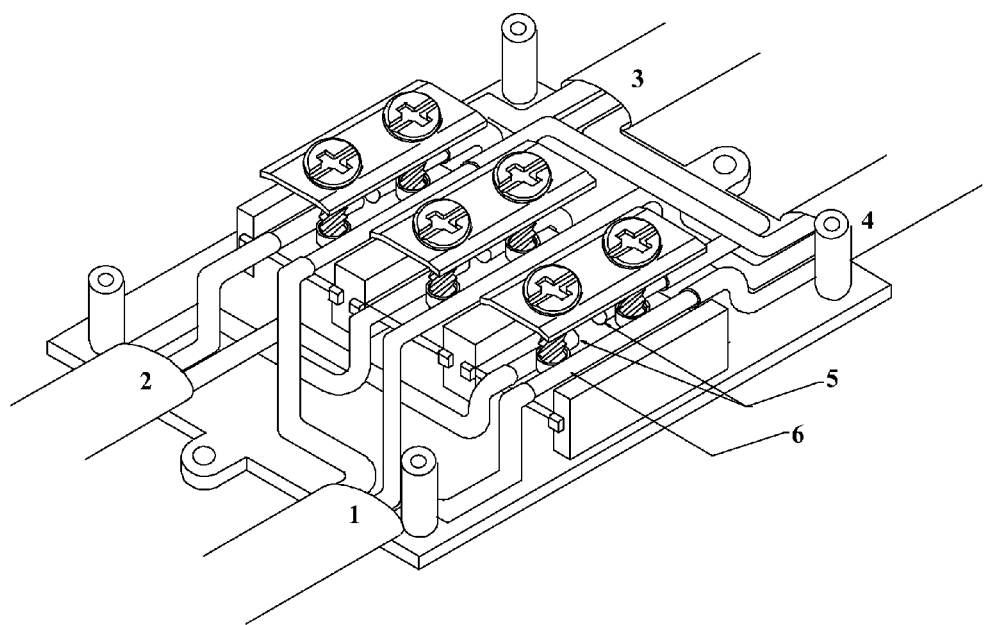
FIG. 17 illustrates the electrical juncture unit with installing electrical wires.

FIG. 17 illustrates the electrical juncture unit with installing electrical wires. Notice the wires are not secure in their position yet. Part 1, 2, 3, and 4 are normal electrical wires. One of them can be an input the rest can be the outputs. Part 5 illustrates how the cutting wire was sandwiched between the two conductors. Part 6 illustrate how the naked wire was sandwiched between the two conductors.

FIG. 18 illustrates the electrical juncture unit wires are installed and secured. The electrical wires connect this way to reduce arcing because the wires are tied down and sandwiched between two conductors. These conductor units provide plenty of conducting surface for current to flow. In turn, it will reduce the heat that is created by the current.

Thus, the electrical juncture unit will reduce the risk of causing fire due to lose the electrical connection. The wires are also boxed in very thick walls so that if there is any arcing, the spark will be contains within these walls. The electrical juncture unit also provides ½ inch blank space at the end of the each unit to serve as buffers between the naked wire and the outside environment of the electrical juncture unit. The unit will also be covered by the cover box (FIG. 20). The wires are also secured by two screws to be sure they are tied down.

Figure 19:
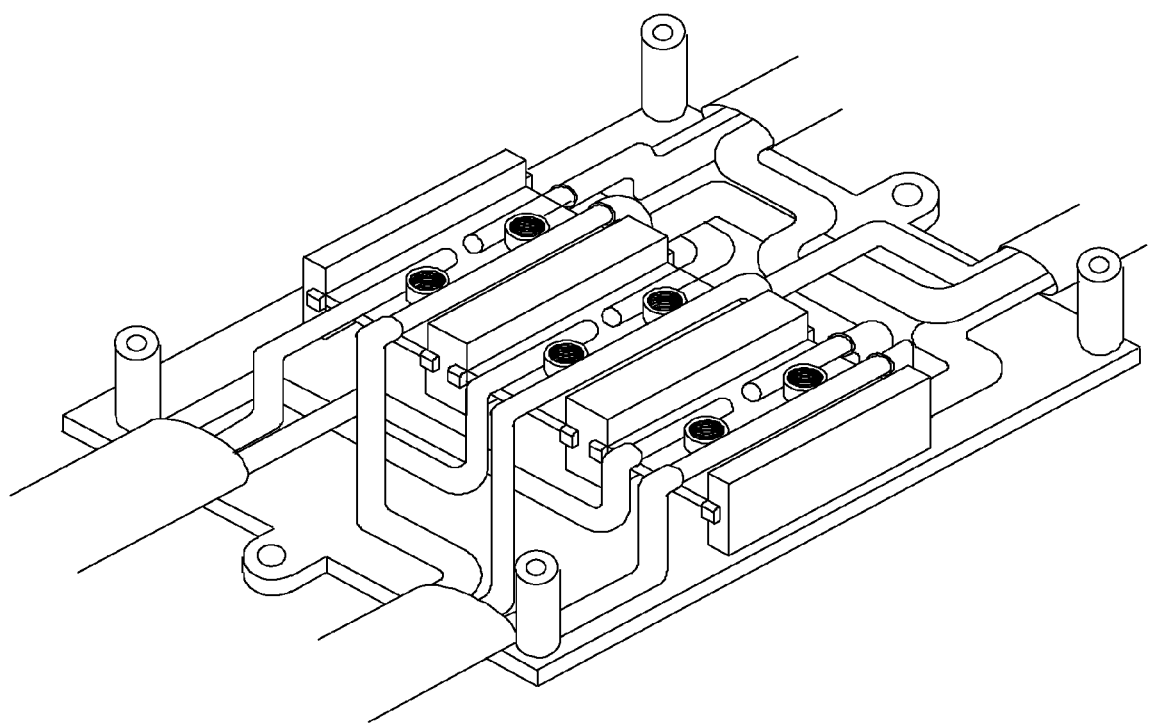
FIG. 19 illustrates the electrical juncture unit with installing electrical wires but no upper conductors and screws.

FIG. 19 illustrates the electrical juncture unit without screws and upper conductors to display the arrangement of the wires after they were installed in the electrical juncture unit.

FIG. 20 illustrates the assembly process of the cover box on the electrical juncture box. Part 1 and 2 illustrates that plastic plates were removed to get room for the electrical wires.

FIG. 21 illustrates the electrical juncture box with installing wires.

FIG. 22 illustrates the electrical juncture box complete assembly.

FIG. 23-1, FIG. 23-2, FIG. 23-3 illustrates the top, front, and side views of the base structure with the conduit connectors of the electrical juncture box; their dimensions are shown in the figures. The base structure will be made out of the same material of the net work box's which is used in an electrical connection.

Figure 24:
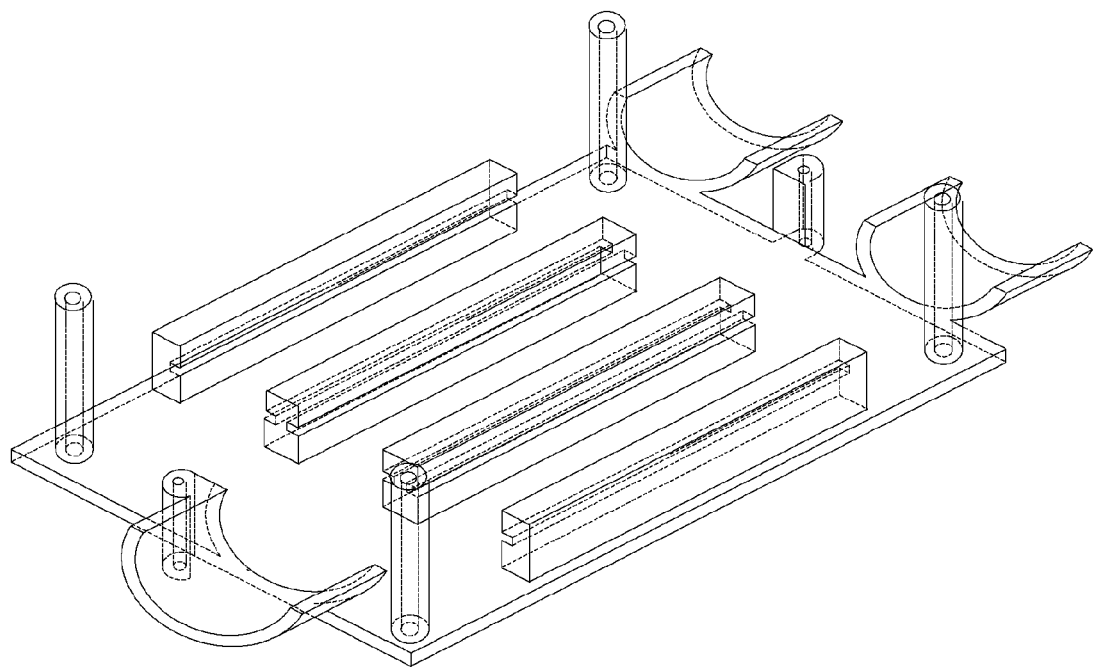
FIG. 24 illustrates the orthographical view of the base structure with the conduit connection.

FIG. 24 illustrates the orthographical view of the base structure with the conduit connectors of the electrical juncture box.

Figure 25:
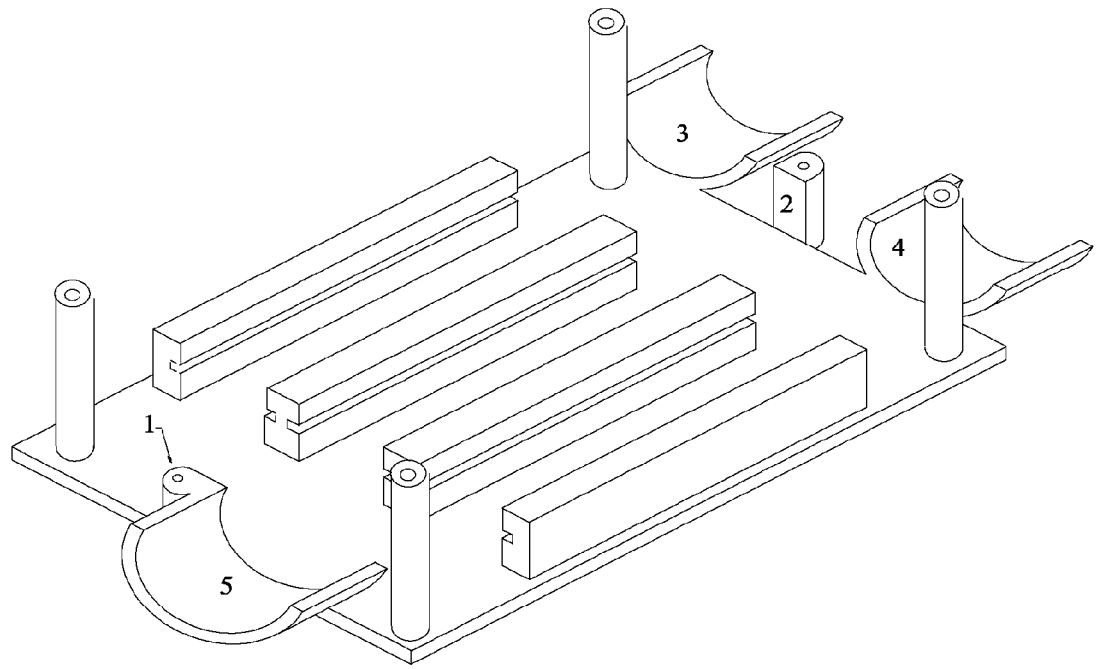
FIG. 25 illustrates the isometric of the base structure with the conduit connection.
Figures 1, 26:
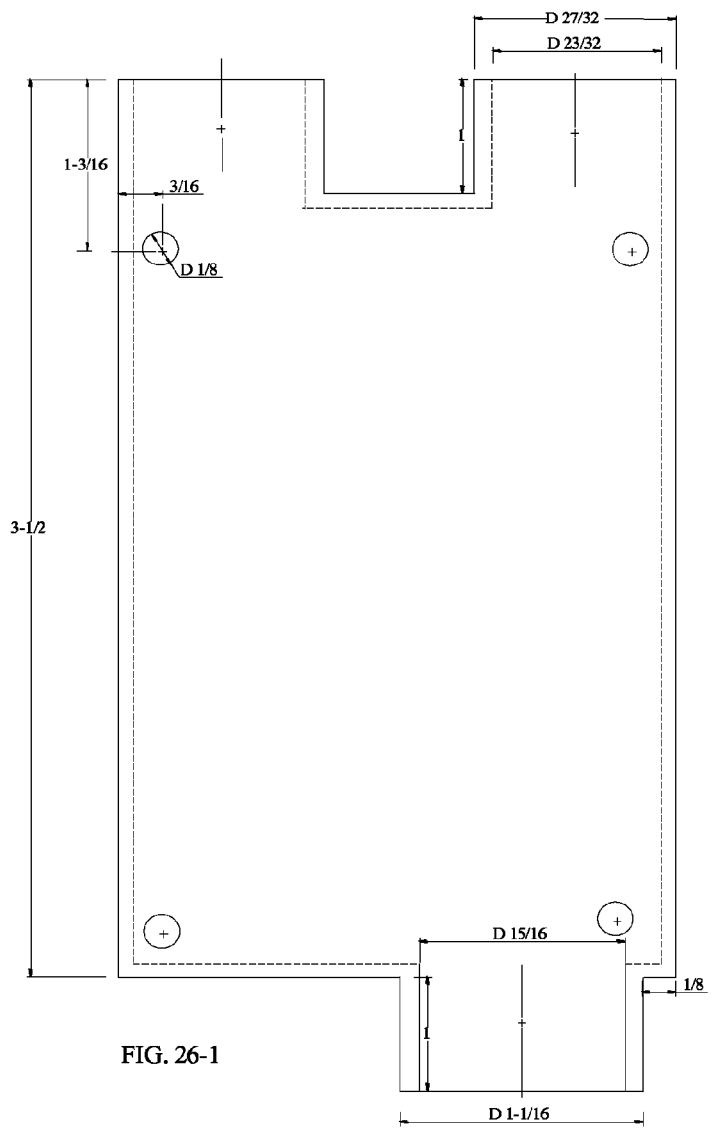
Figures 2, 26:
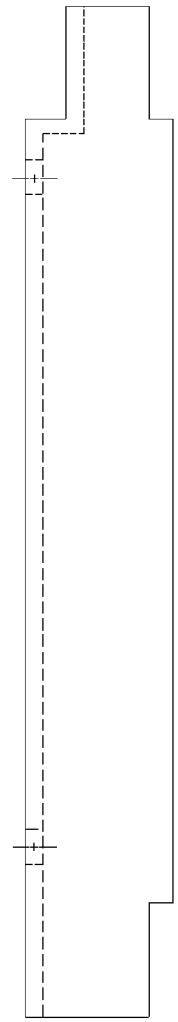
Figures 3, 26:
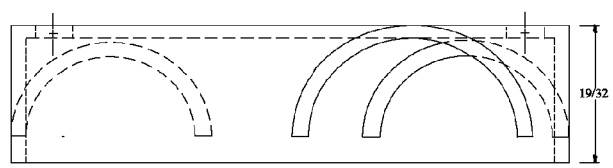

FIG. 25 illustrates the isometric view of the base structure with the conduit connectors of the electrical juncture box. Part 1 and 2 are nail holes to secure the base on the existing structure. Part 3 and 4 are male conduit connectors. They are used to connect to the conduits. Part 5 is the female conduit connector.

FIG. 26-1, FIG. 26-2, FIG. 26-3 illustrates the top, front and side views of the cover box with the conduit connectors of the electrical juncture box; their dimensions are shown in the figures. The cover box will be made out of the same material of the net work box's which is used in an electrical connection.

Figure 27:
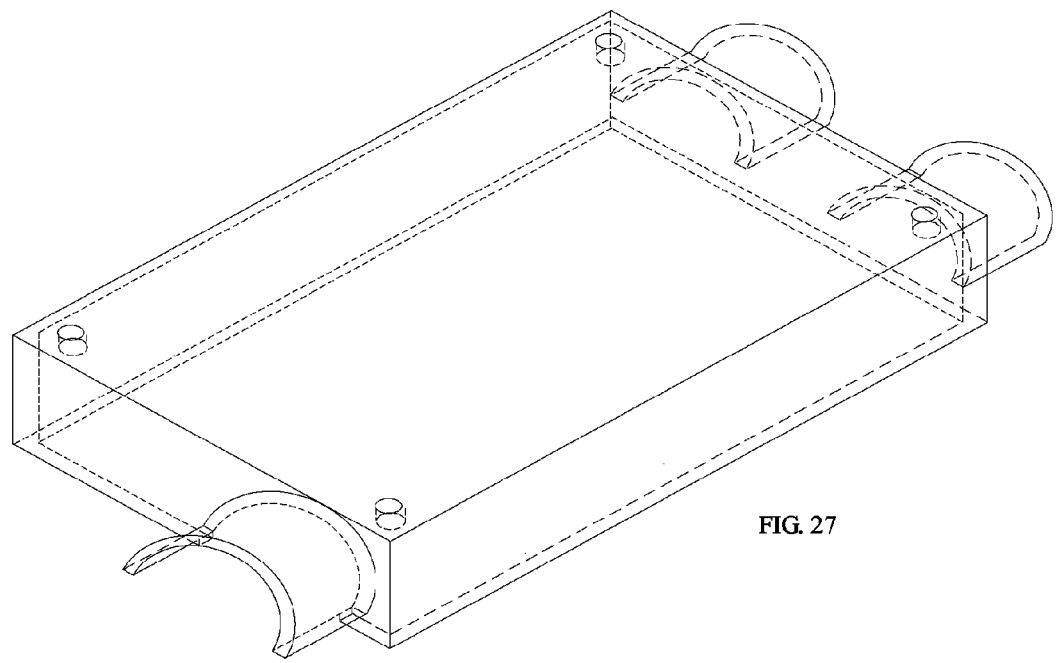
FIG. 27 illustrates the orthographical view of the cover box with the conduit connectors.

FIG. 27 illustrates the orthographical view of the cover box with the conduit connectors of the electrical juncture box.

Figure 28:
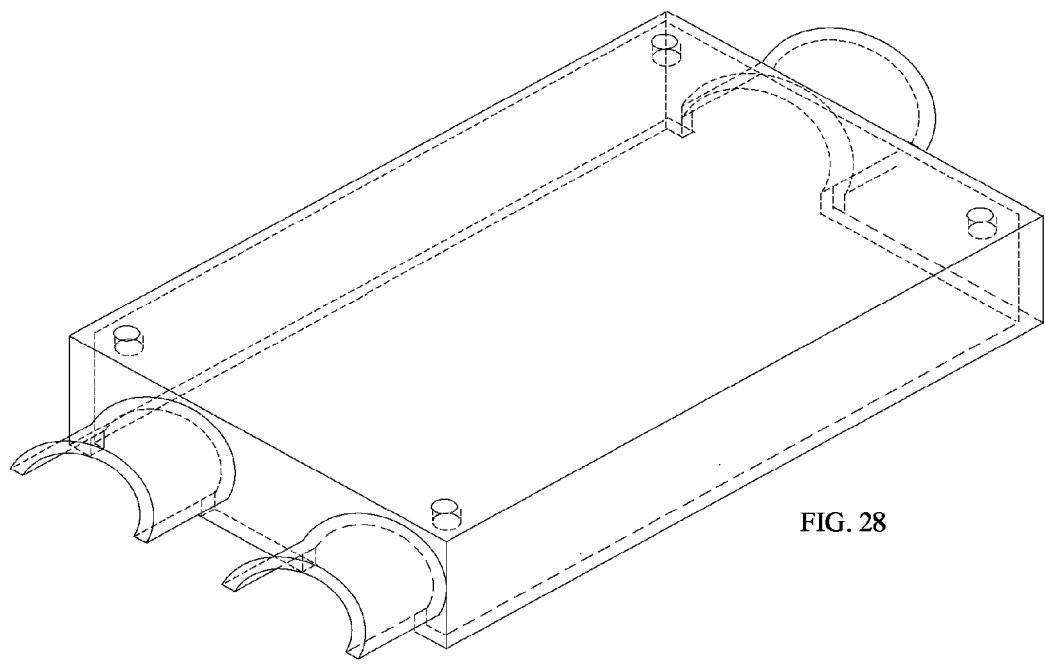
FIG. 28 illustrates the orthographical view of the cover box with the conduit connectors at a 180 degree turn.

FIG. 28 illustrates the other side of the orthographical view of the cover box with the conduit connectors of the electrical juncture box. It is turned 180 degrees.

Figure 29:
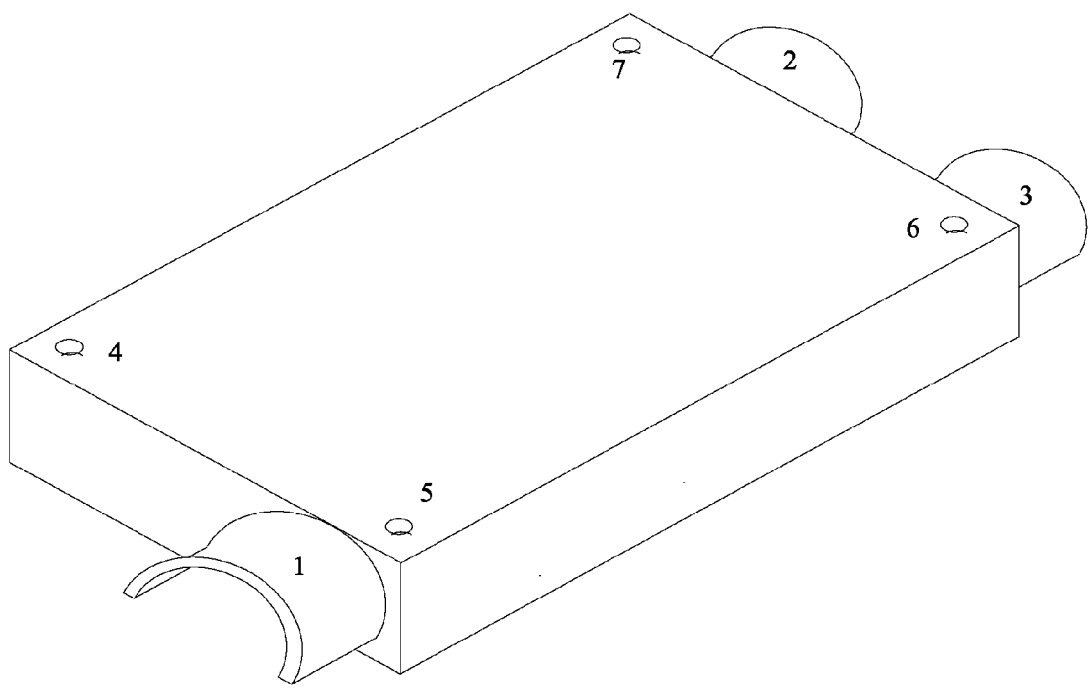
FIG. 29 illustrates the isometric view of the cover box with the conduit connectors.

FIG. 29 illustrates the isometric view of the cover box with the conduit connectors of the electrical juncture box.

Figure 30:
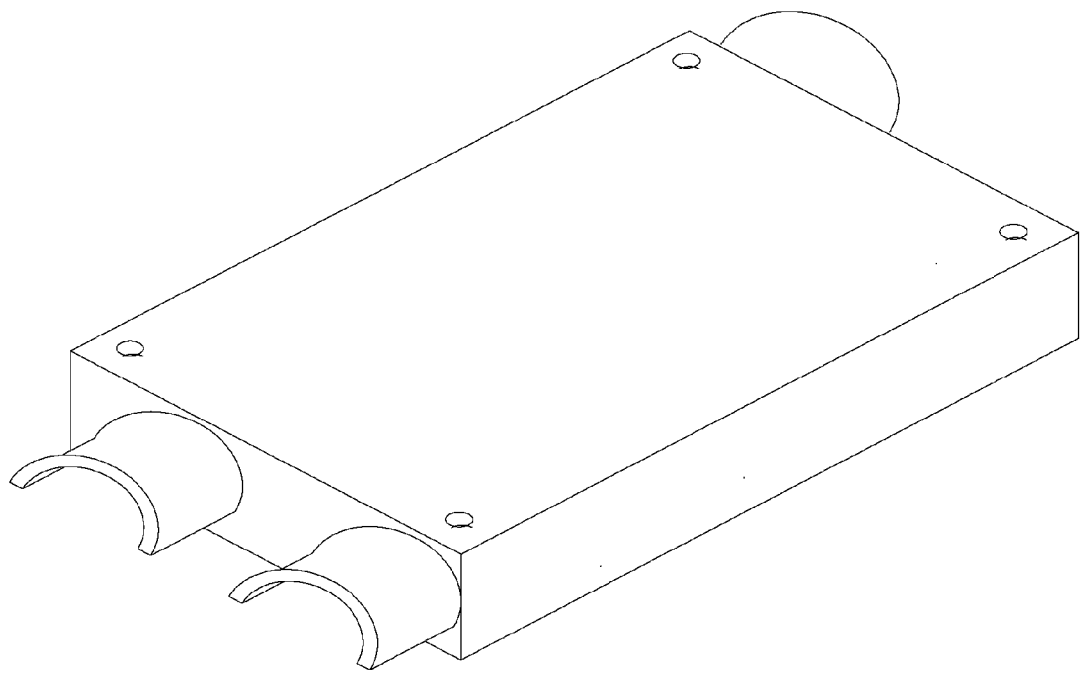
FIG. 30 illustrates the isometric view of the cover box with the conduit connectors at a 180 degree turn.

FIG. 30 illustrates the other side of the isometric view of the cover box with the conduit connectors of the electrical juncture box. It is turned 180 degrees.

Figure 31:
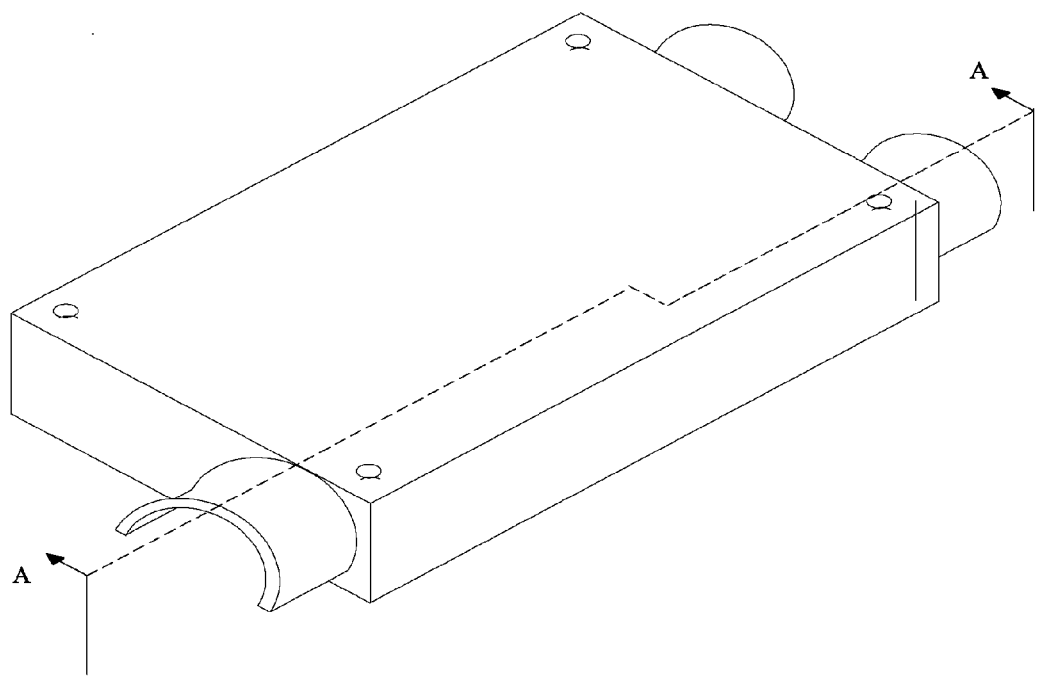
FIG. 31 illustrates the isometric cutting plane A-A of the conduit connectors.

FIG. 31 illustrates the isometric view of the cutting plane of the cover box.

Figure 32:
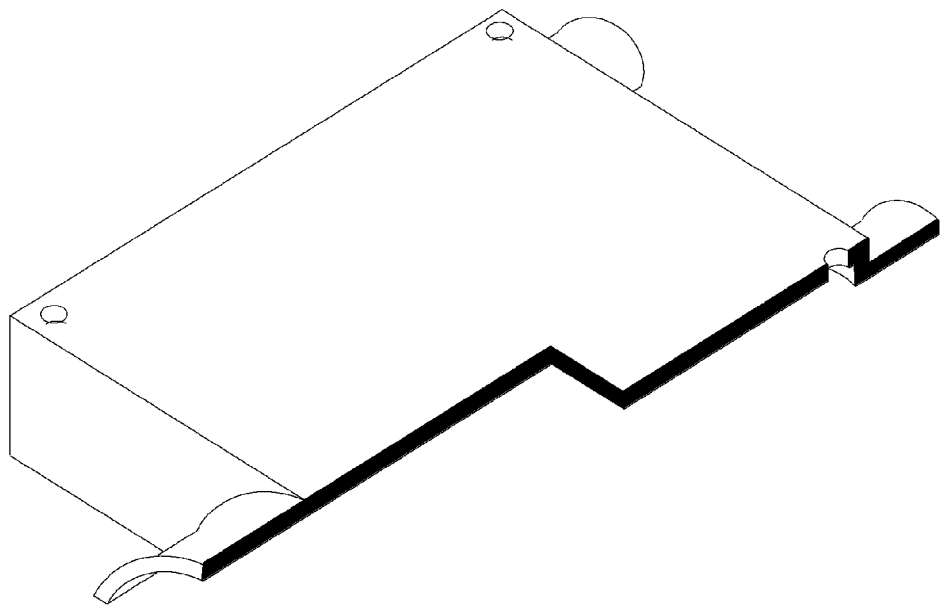
FIG. 32 illustrates the isometric cutting section of the cover box with the conduit connectors.

FIG. 32 illustrates the isometric sectional view. It shows the openness of the bottom side of the cover box.

Figure 33:
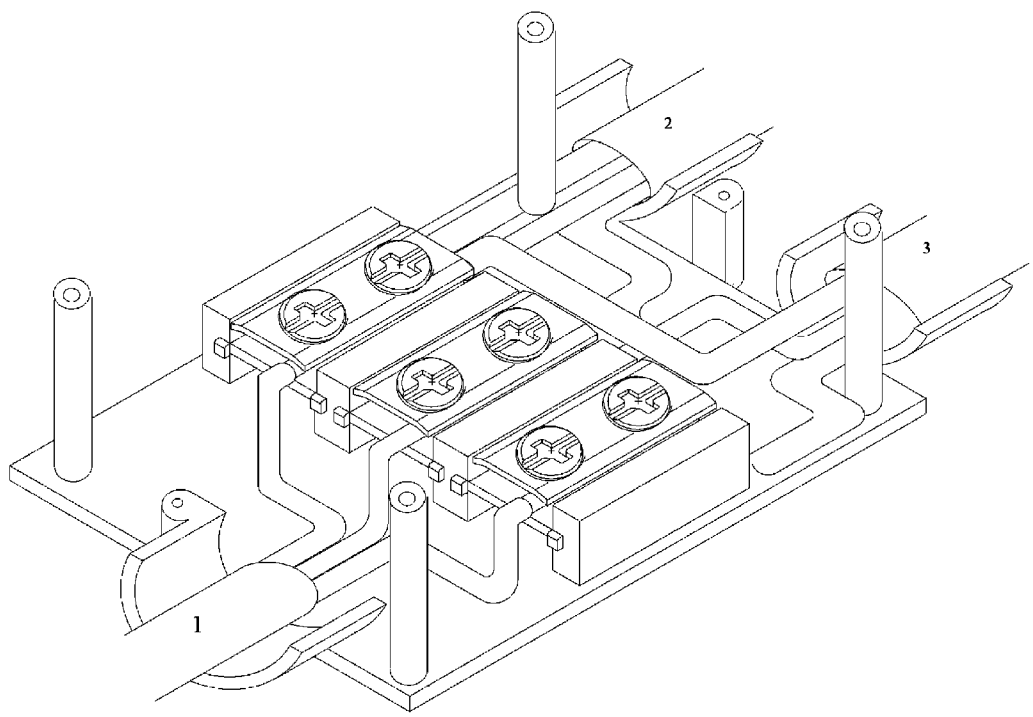
FIG. 33 illustrates the EJB with the conduit connectors, and installing electrical wires.

FIG. 33 illustrates the electrical juncture unit wires installed and secured. The electrical wires connected this way will reduce arcing because the wires are tied down and sandwiched between two conductors. These conductors unit provide plenty of conducting surface for the current to flow. It will also reduce the heat that is created by the current. Thus, the electrical juncture unit will reduce the risk of causing fire by the electrical connection. The wires are also boxed in very thick walls so that if there is any arcing the spark will be contained within these walls. The electrical juncture unit also provides ½ an inch of blank space at each end of the unit to serve as buffers between the naked wire and the outside environment. The unit will also be covered by the cover box (FIG. 20). The wires also secured by two screws to be sure they are tied down. The male and female connectors allow the conduits to connect to the electrical juncture unit and to protect the electrical connection from weather.

Figure 34:
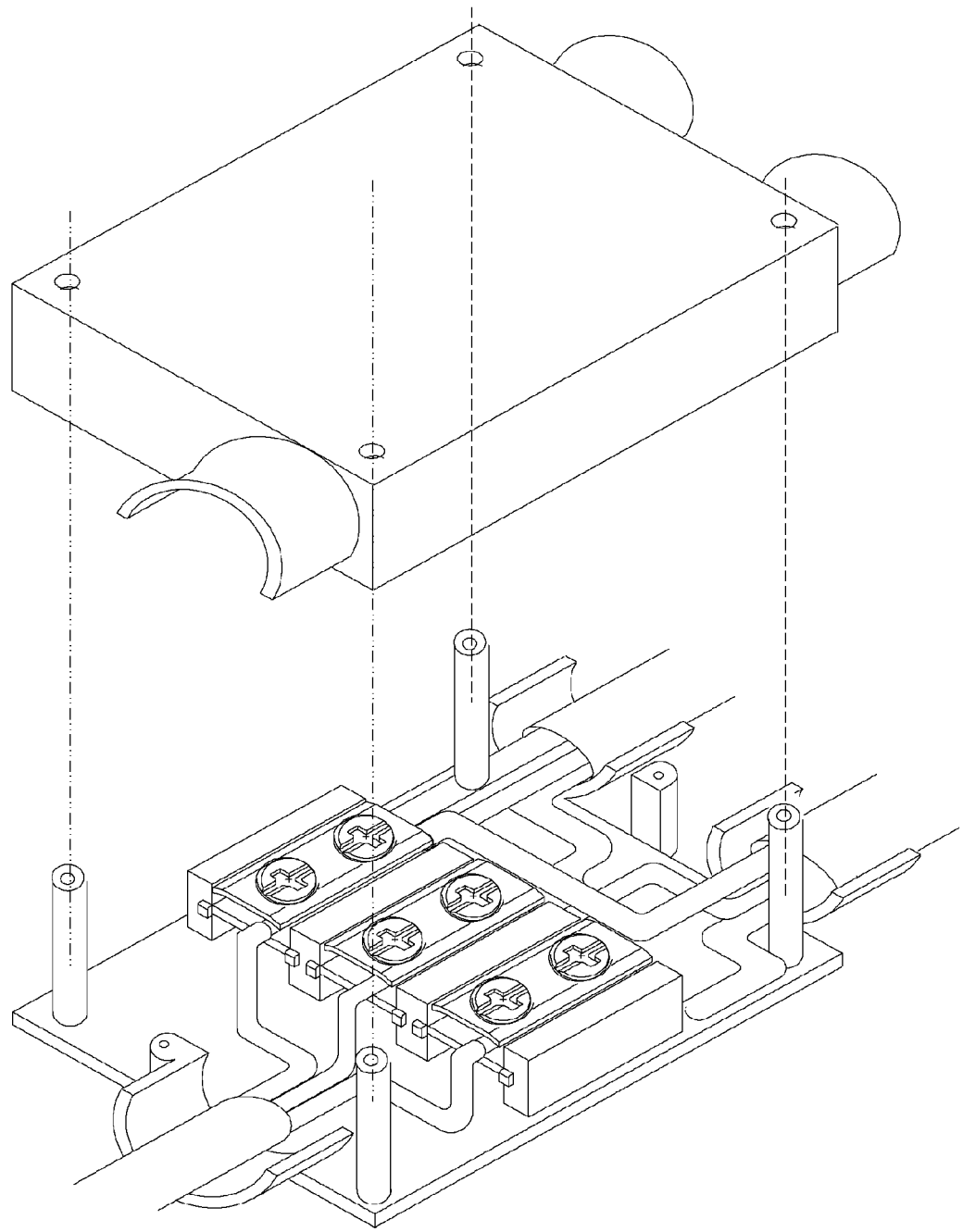
FIG. 34 illustrates the process of installing the cover box on the electrical juncture unit.

FIG. 34 illustrates the process of the assembly of the cover box on the electrical juncture box.

Figure 35:
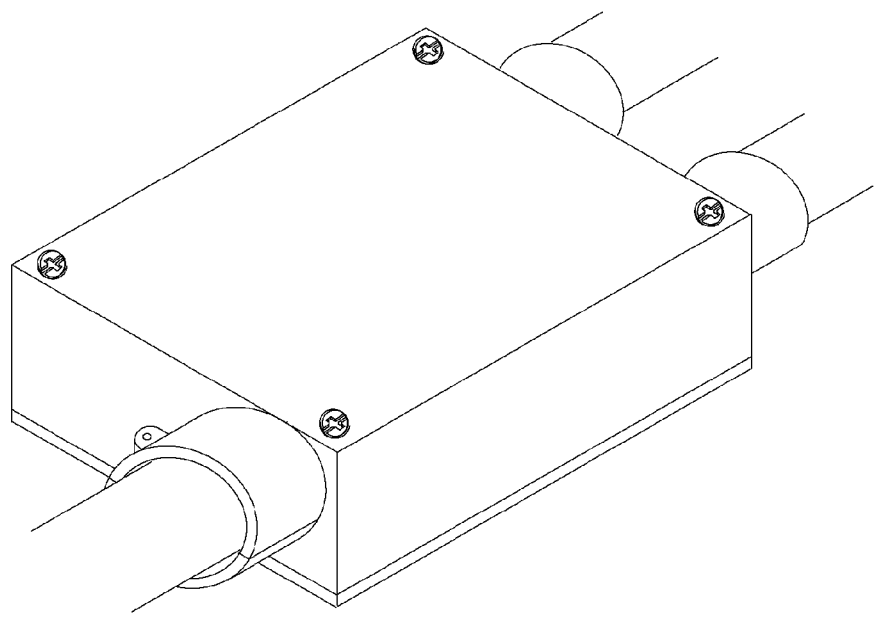
FIG. 35 illustrates the complete EJB with the installation of electrical wires.

FIG. 35 illustrates the electrical juncture box with the installation of the wires.

Figure 36:
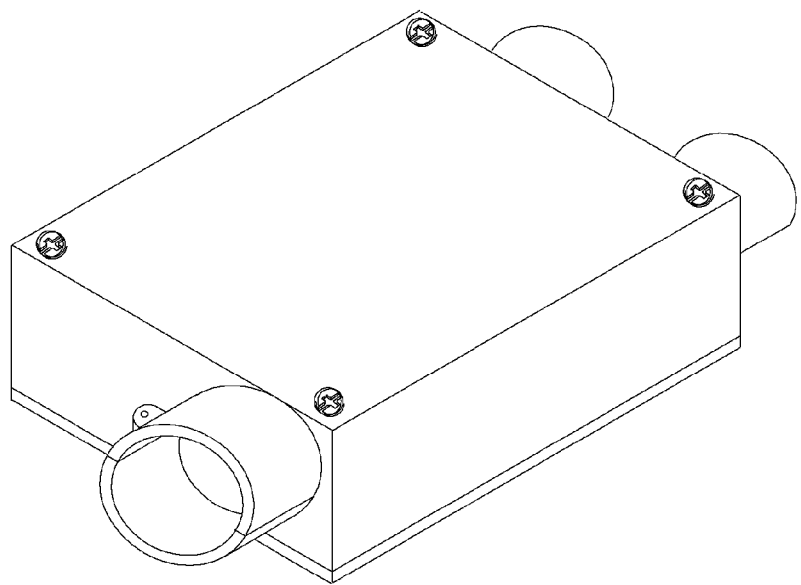
FIG. 36 illustrates the complete EJB.

FIG. 36 illustrates the complete assembly of the EJB.

The invention claimed is:

1. A convenient electrical juncture box to provide an electrical connection and a plurality of parts for use to repair the damage of a stretch out electrical line, or for adding electrical lines to the installed electrical line comprising:
   (A) a conductor unit having lower conductor plate and upper conductor plate connecting together by a plurality of screws; and
      wherein said lower conductor plate is a piece of conductor having a plurality of threaded holes, and a plurality of sentinel keys, wherein said sentinel keys of one end of said lower conductor plate are bended upper, wherein said threaded holes means holes with threads, wherein said sentinel keys are pieces of conductor projecting out at the end of the said lower conductor plate; and
      wherein said upper conductor is a piece of conductor having a plurality holes, wherein the long edges of said upper conductor plate bending down slightly, and wherein the screws passing through the holes of said upper conductor plate to engage to said threaded holes of said lower conductor plate to keep said lower conductor and upper conductor loosely connecting together;
   (B) a non-conductor base structure having a plurality of bearers, a plurality of non-conductor inner threaded columns, and a plurality of holes; and
      wherein said non-conductor base is a piece of non-conductor; and
      wherein said bearers are non-conductor blocks raising up from the surface of said non-conductor base structure, and along the long edges of said non-conductor base, wherein said bearers on the edges of said non-conductor base are outer bearers, and each one said bearer having a slot, wherein said bearers inside said non-conductor base are inner bearers and each one having a plurality of slots, and said slots facing each other, and wherein said bearers also are the insulators between said conductor units; and
      wherein said a plurality of slots are the gaps that left behind when part of said bearers were cut and removed along the long sides of said bearers, wherein said slots having a space between the surface of said non-conductor base and said slots;
      and wherein said threaded columns are non-conductors raising from the surface of said non-conductor base structure with thread holes on their tops; and
      wherein said holes are the holes go through the surface of said non-conductor base to bottom of said non-conductor base;
   (C) a non-conductor cover box having five walls enclosed, one side opened, and a plurality of holes on the side that opposite the opened side; and
   (D) a convenient electrical juncture box including screws for securing said non-conductor cover on the top of said non-conductor base, nails for securing said non-conductor base; wherein said securing means comprised a rivet.

2. A convenient electrical juncture box in according with claim 1, wherein said parts including conductor units, crews, nails, non-conductor cover box, and non-conductor base.

3. A convenient electrical juncture box in according with claim 1, wherein said conductor units sliding into said slots of said non-conductor base, wherein said keys of said conductor units will be bent down to secure said the conductor units in said slots.

4. A convenient electrical juncture box in according with claim 1, wherein said conductor unit in use said upper conductor plate moving down to sandwich the electrical conductor wire between said upper conductor plate and lower conductor plate as screws driven down, wherein said lower conductor plate is rigid and said upper conductor and the screws are movable parts.

5. A convenient electrical juncture box in according with claim 1 further comprising a plurality of conduit connectors for use to connect with conduit for exterior use, wherein said conduit connectors a non-conductor cylinders attaching to the ends of said convenient electrical juncture box.

6. A convenient electrical juncture box in according with claim 1 having a electrical source input and a plurality electrical outputs, wherein said electrical source input is electricity supplying through a conductor to said convenient electrical juncture box, wherein said electrical outputs are electricity going out from said convenient electrical juncture box through conductors.

* * * * *